(12) United States Patent
Matsumoto et al.

(10) Patent No.: US 12,512,642 B2
(45) Date of Patent: Dec. 30, 2025

(54) MONITORING DEVICE, MONITORING METHOD, OPTICAL AMPLIFIER, AND OPTICAL TRANSMISSION SYSTEM

(71) Applicant: NEC Corporation, Tokyo (JP)

(72) Inventors: Keiichi Matsumoto, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 818 days.

(21) Appl. No.: 17/797,959

(22) PCT Filed: Feb. 15, 2021

(86) PCT No.: PCT/JP2021/005509
§ 371 (c)(1),
(2) Date: Aug. 5, 2022

(87) PCT Pub. No.: WO2021/172068
PCT Pub. Date: Sep. 2, 2021

(65) Prior Publication Data
US 2023/0047836 A1 Feb. 16, 2023

(30) Foreign Application Priority Data
Feb. 27, 2020 (JP) ................ 2020-031279

(51) Int. Cl.
H01S 3/067 (2006.01)
G02B 6/02 (2006.01)
(Continued)

(52) U.S. Cl.
CPC ...... *H01S 3/06737* (2013.01); *G02B 6/02042* (2013.01); *H01S 3/06754* (2013.01);
(Continued)

(58) Field of Classification Search
None
See application file for complete search history.

(56) References Cited

U.S. PATENT DOCUMENTS 11,349,564 B2 * 5/2022 Isoda .................. H04B 10/25
2018/0337726 A1 11/2018 Oda et al.
(Continued)

FOREIGN PATENT DOCUMENTS

JP 2016-225899 A 12/2016
JP 2017-022638 A 1/2017
(Continued)

OTHER PUBLICATIONS

International Search Report for PCT Application No. PCT/JP2021/005509, mailed on Apr. 27, 2021.
(Continued)

*Primary Examiner* — Eric L Bolda
(74) *Attorney, Agent, or Firm* — Sughrue Mion, PLLC

(57) ABSTRACT

Provided are a monitoring device, a monitoring method, an optical amplifier, and an optical transmission system that are adapted for an increase in the number of cores in a multi-core optical fiber transmission path, and that are suitable for crosstalk monitoring. The monitoring device monitors a multi-core optical fiber transmission path comprising a plurality of use core and at least one or more non-use cores. The monitoring device comprises: an applying means for applying dithering to signal light propagating in the use cores; a monitoring means for monitoring the power of the non-use cores; and a separating means for separating a monitoring result from the monitoring means into power components from the plurality of use cores.

20 Claims, 16 Drawing Sheets

(51) Int. Cl.
*H01S 3/13* (2006.01)
*H04J 14/00* (2006.01)
*G01M 11/00* (2006.01)

(52) U.S. Cl.
CPC ........ *H01S 3/13013* (2019.08); *H04J 14/052* (2023.08); *G01M 11/333* (2013.01)

(56) References Cited

U.S. PATENT DOCUMENTS

2020/0056958 A1  2/2020  Hasegawa et al.
2022/0115830 A1  4/2022  Yanagimachi et al.

FOREIGN PATENT DOCUMENTS

| WO | 2013/179604 A1 | 12/2013 |
| WO | 2017/090616 A1 | 6/2017 |
| WO | 2018/207915 A1 | 11/2018 |
| WO | 2020/171103 A1 | 8/2020 |

OTHER PUBLICATIONS

English translation of Written opinion for PCT Application No. PCT/JP2021/005509, mailed on Apr. 27, 2021.

* cited by examiner $$\begin{pmatrix} aX_1 & bX_2 & cX_3 & dX_4 \\ eX_1 & fX_2 & gX_3 & hX_4 \\ iX_1 & jX_2 & kX_3 & lX_4 \\ mX_1 & nX_2 & oX_3 & pX_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

Fig. 4

$$\begin{pmatrix} 1.05X_1 & X_2 & X_3 & X_4 \\ X_1 & 1.05X_2 & X_3 & X_4 \\ X_1 & X_2 & 1.05X_3 & X_4 \\ X_1 & X_2 & X_3 & 1.05X_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

$$\text{TIME 1} \begin{pmatrix} 1.05X_1 & X_2 & X_3 & X_4 \\ X_1 & X_2 & X_3 & X_4 \\ X_1 & X_2 & X_3 & X_4 \\ X_1 & X_2 & X_3 & X_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

$$\text{TIME 2} \begin{pmatrix} X_1 & X_2 & X_3 & X_4 \\ X_1 & 1.05X_2 & X_3 & X_4 \\ X_1 & X_2 & X_3 & X_4 \\ X_1 & X_2 & X_3 & X_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

$$\text{TIME 3} \begin{pmatrix} X_1 & X_2 & X_3 & X_4 \\ X_1 & X_2 & X_3 & X_4 \\ X_1 & X_2 & 1.05X_3 & X_4 \\ X_1 & X_2 & X_3 & X_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

$$\text{TIME 4} \begin{pmatrix} X_1 & X_2 & X_3 & X_4 \\ X_1 & X_2 & X_3 & X_4 \\ X_1 & X_2 & X_3 & X_4 \\ X_1 & X_2 & X_3 & 1.05X_4 \end{pmatrix} \begin{pmatrix} P_1 \\ P_2 \\ P_3 \\ P_4 \end{pmatrix} = \begin{pmatrix} P_{mon1} \\ P_{mon2} \\ P_{mon3} \\ P_{mon4} \end{pmatrix}$$

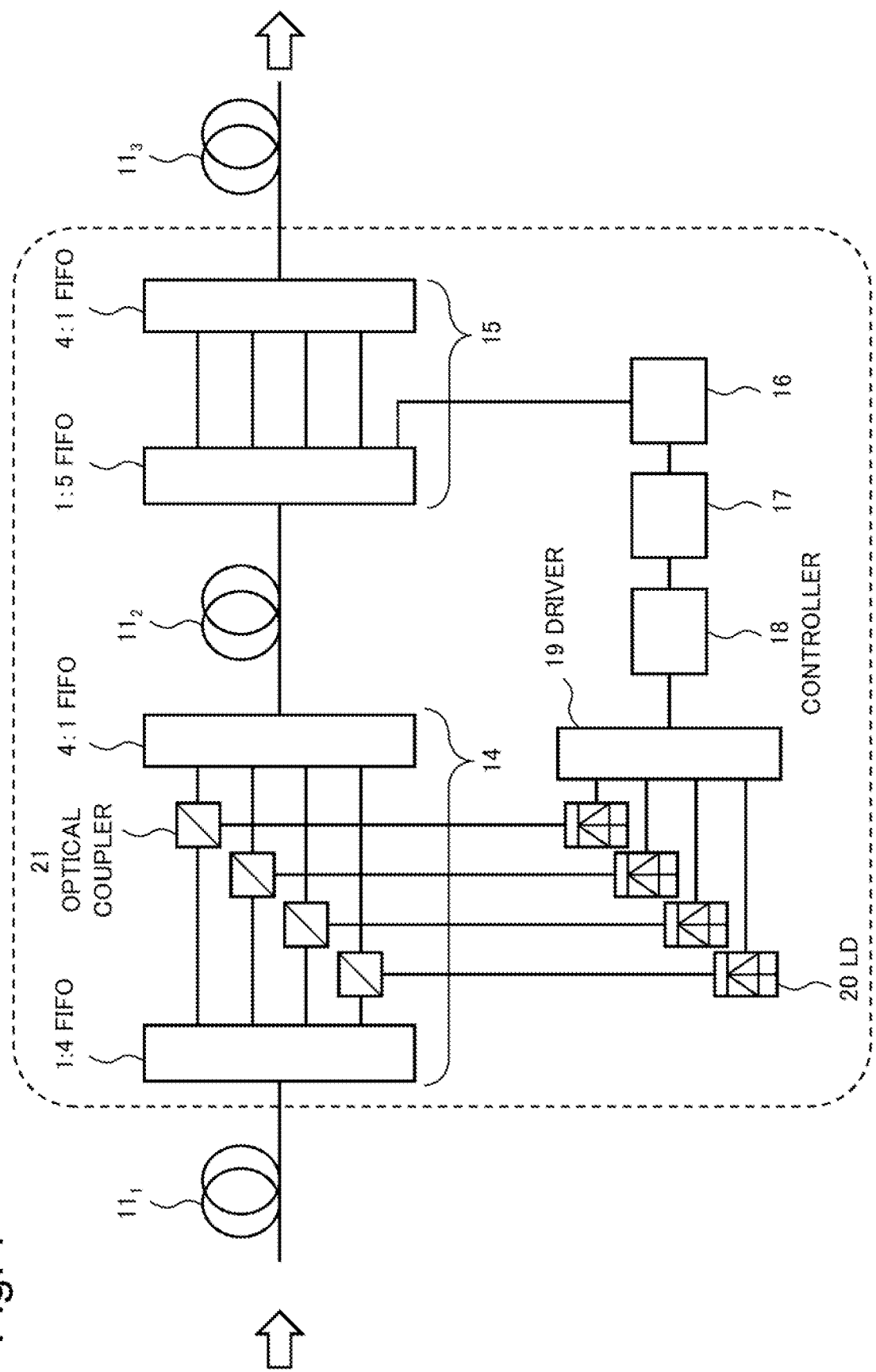

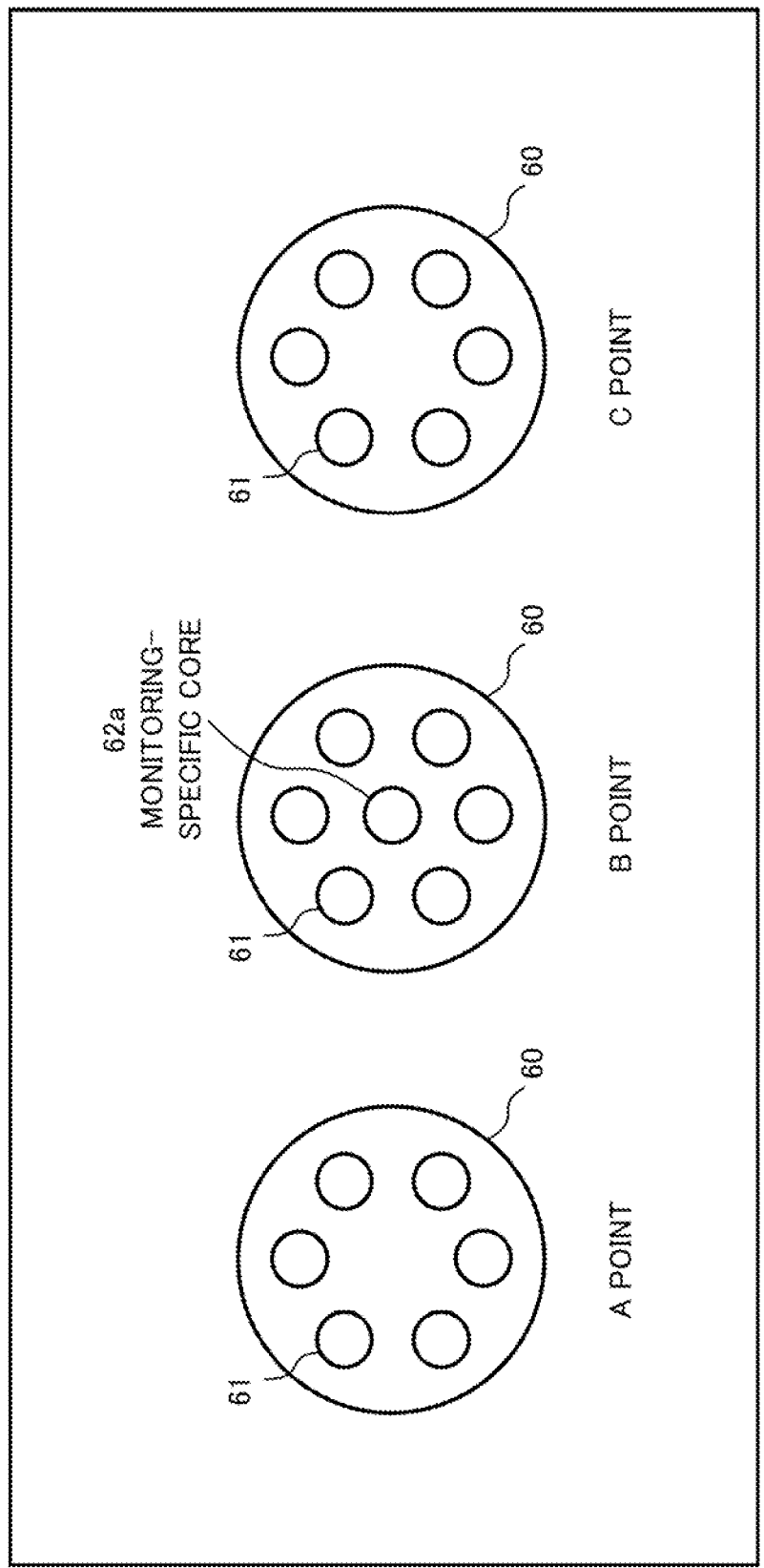

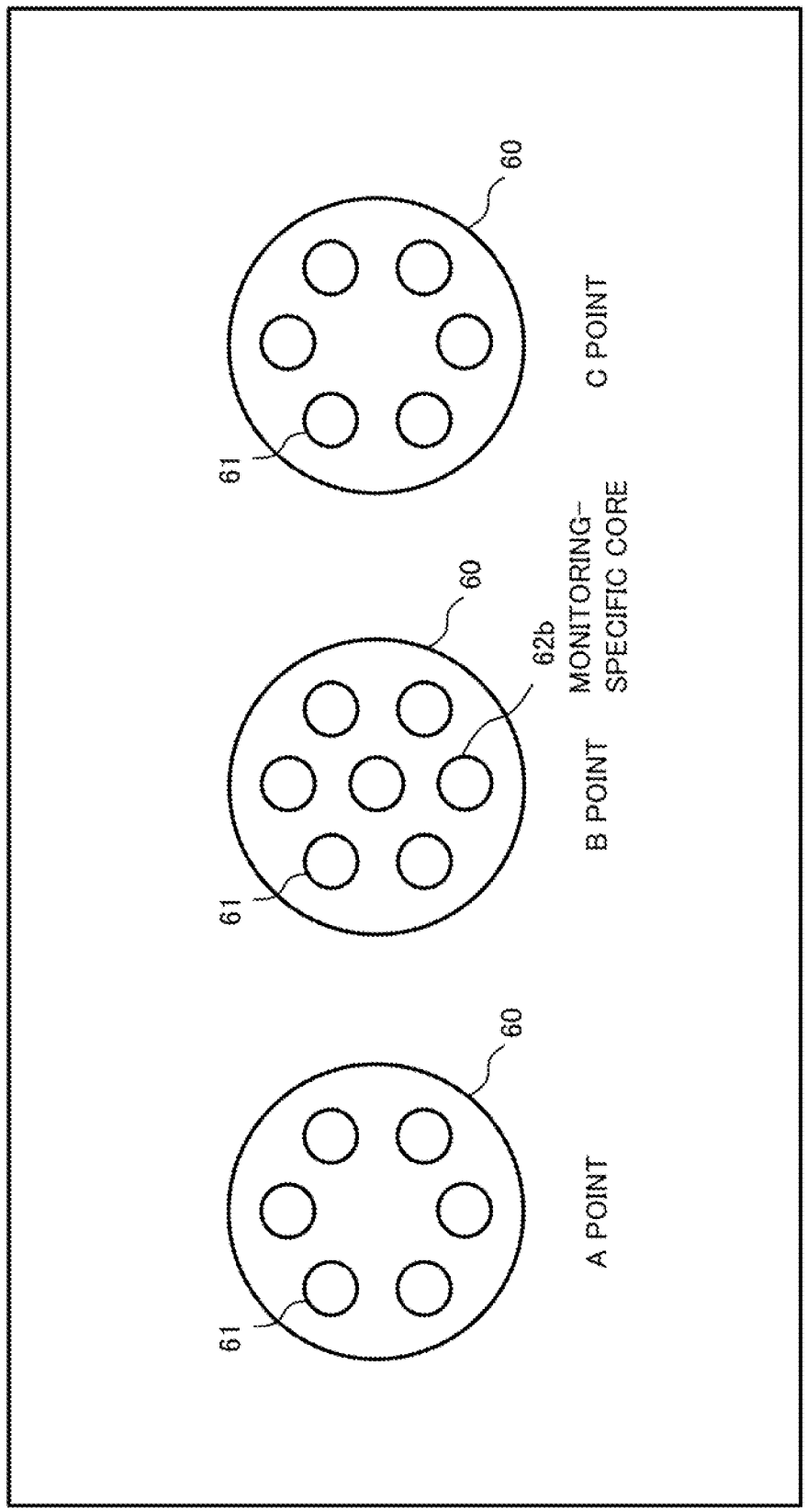

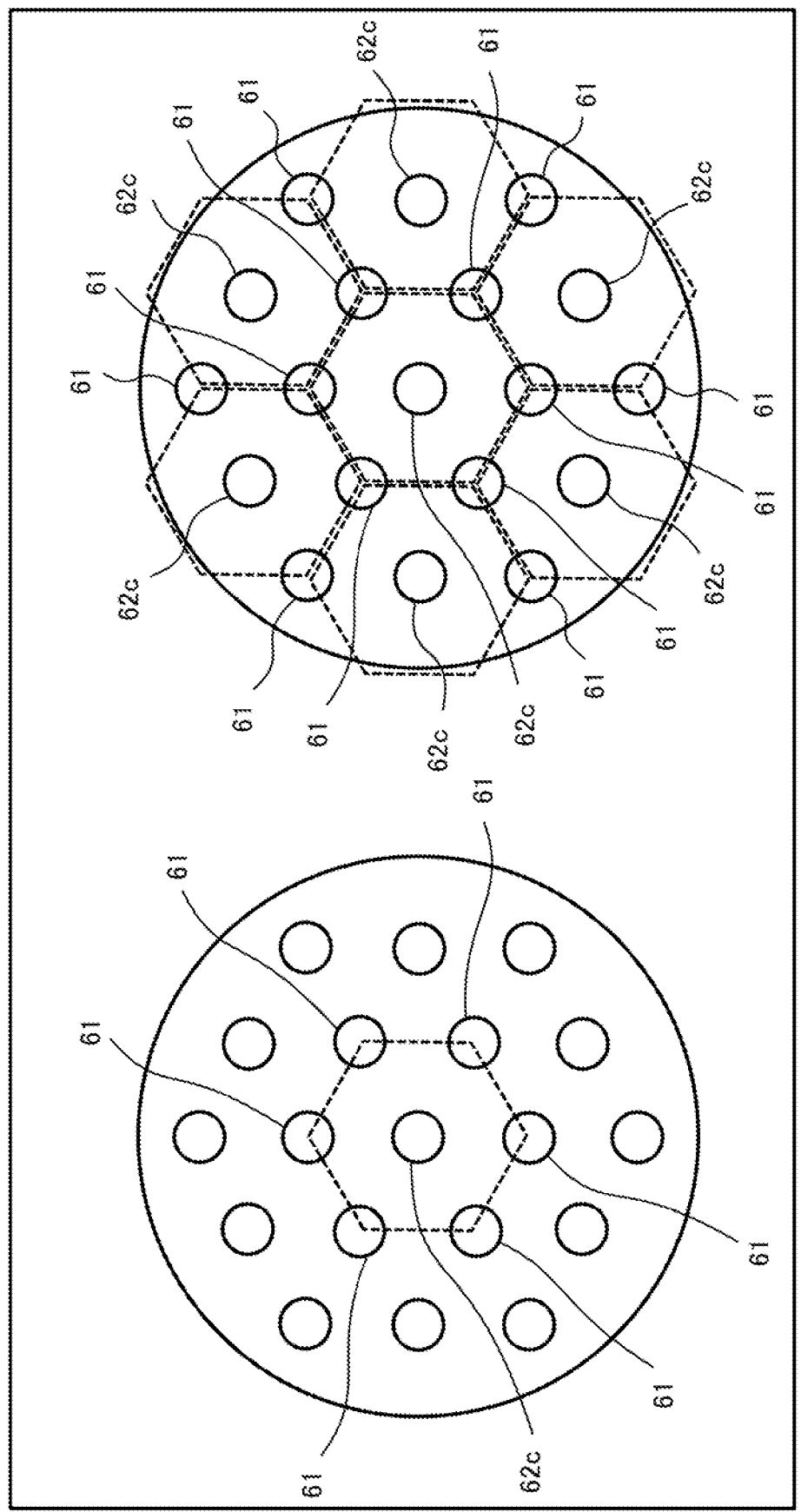

MONITORING DEVICE, MONITORING METHOD, OPTICAL AMPLIFIER, AND OPTICAL TRANSMISSION SYSTEM

This application is a National Stage Entry of PCT/JP2021/005509 filed on Feb. 15, 2021, which claims priority from Japanese Patent Application 2020-031279 filed on Feb. 27, 2020, the contents of all of which are incorporated herein by reference, in their entirety.

TECHNICAL FIELD

The present invention relates to a monitoring device, a monitoring method, an optical amplifier, and an optical transmission system, and particularly relates to crosstalk monitoring of a multi-core optical fiber transmission path.

BACKGROUND ART

As an optical fiber amplifier that amplifies signal intensity of an optical signal, there is an optical fiber amplifier that amplifies signal intensity of an optical signal by inputting, to a rare-earth additive fiber to which the optical signal is input, pumping light being output from a pumping light source. For example, a structure in which erbium (Er) as one example of a rare-earth element is added to a core portion of a fiber is known.

An optical fiber amplifier being used in a band of 1.55 µm being a low-loss wavelength region in optical fiber communication has a structure in which erbium is added to a core portion of a fiber, activates an erbium ion in an optical fiber by pumping light in a band of 0.98 µm or 1.48 µm, uses laser transition in a band of 1.55 µm of erbium, and sufficiently amplifies signal light in a band of 1.55 µm by semiconductor laser diode pumping.

Since an optical fiber amplifier has high efficiency and high gain, and gain is almost independent of polarization, the optical fiber amplifier is used as an amplifier for optical signal relay in an optical fiber communication system. In the optical fiber communication system, a wavelength division multiplexing (WDM) transmission technique for multiplexing a plurality of wavelengths in order to achieve large-capacity communication is adopted, and an amplifier collectively amplifies all channels.

Further, in recent years, a space division multiplexing (SDM) transmission technique has been discussed in order to achieve larger-capacity communication, and transmission using a multi-core optical fiber including a plurality of cores in one clad has been studied. In the SDM transmission technique, it has been discussed that signal light propagating through each core of a multi-core optical fiber is amplified by a core-individual pumping method of supplying pumping light to each core, or a clad-collective pumping method of causing pumping light to enter a clad around a core and supplying the pumping light to all the cores collectively.

In transmission using a multi-core optical fiber including a plurality of cores in one clad, a measure against crosstalk due to light leaking from another core in the multi-core optical fiber is needed. The crosstalk becomes more conspicuous with design in which the number of cores in a multi-core optical fiber is increased or with design in which a pitch between cores in a multi-core optical fiber is reduced in order to achieve larger-capacity communication.

Patent Literature 1 (PTL1) filed as Japanese Patent Application No. 2019-30342 (filing date: Feb. 22, 2019) and followed by published as International Publication of International Patent Application proposes that an optical power monitor is provided for each core as a measure against crosstalk between cores of an optical transmission system using a multi-core optical fiber. PTL 1 proposes that an optical power monitor for each core monitors each optical power, and proposes that a measure against crosstalk is taken in response to a monitoring result.

CITATION LIST

Patent Literature

[PTL1] International Publication No. WO2020/171103

SUMMARY OF INVENTION

Technical Problem

However, the measure in the background art described above against crosstalk between cores of an optical transmission system using a multi-core optical fiber has the following problem.

As in the background art, when a configuration for monitoring output light intensity by providing an optical power monitor for each core of a multi-core optical fiber, and adjusting signal output intensity propagating through a core in response to a monitoring result is adopted, the number of monitoring parts and the like increases in proportion to the number of cores. As the number of cores of a multi-core optical fiber is increased in order to achieve larger-capacity communication, a problem of an increase in the number of parts becomes more conspicuous.

For example, when an optical transmission system using a multi-core optical fiber is used as an optical submarine cable system, the monitoring part described above is disposed on a submarine repeater. Since space saving is required for the repeater in the optical submarine cable system, a requirement for space saving that is essential for the submarine repeater is hampered when an optical power monitor is provided for each core of a multi-core optical fiber as in the background art.

Therefore, an object of the present invention is to provide a monitoring device, a monitoring method, an optical amplifier, and an optical transmission system that are able to handle an increase in core number of a multi-core optical fiber transmission path and are suitable for crosstalk monitoring.

Solution to Problem

In order to achieve the object described above, a monitoring device according to the present invention is a monitoring device of a multi-core optical fiber transmission path including a plurality of used cores and at least one or more non-used cores, and includes:
  an application means for applying dither to signal light propagating through the used core;
  a monitoring means for monitoring power of the non-used core; and
  a separation means for separating a monitoring result of the monitoring means into a power component from the plurality of used cores.

An optical amplifier according to the present invention includes:
  an optical amplification means that is inserted into a multi-core optical fiber transmission path including a plurality of used cores and at least one or more non-used cores, and amplifies an optical signal propagating through the plurality of used cores; and the monitoring device described above.

An optical transmission system according to the present invention includes:

a multi-core optical fiber transmission path including a plurality of used cores and at least one or more non-used cores; and the optical amplifier described above.

A monitoring method according to the present invention is a monitoring method of a multi-core optical fiber transmission path including a plurality of used cores and at least one or more non-used cores, and includes:

applying dither to signal light propagating through the used core;

monitoring power of the non-used core; and separating the monitoring result into a power component from the plurality of used cores.

Advantageous Effects of Invention

According to the present invention, a monitoring device, a monitoring method, an optical amplifier, and an optical transmission system that are able to handle an increase in core number of a multi-core optical fiber transmission path and are suitable for crosstalk monitoring can be provided.

BRIEF DESCRIPTION OF DRAWINGS

FIG. 4 is a determinant for describing a technique for calculating a crosstalk amount from a monitoring result.

FIG. 5 is a determinant for describing a relationship between dither application and calculation of a crosstalk amount.

FIG. 6 is a schematic diagram for describing a relationship between one example of more specific dither application and one example of a determinant at that time.

FIG. 7 is a block diagram for describing a monitoring device, an optical amplifier, and an optical transmission system according to a third example embodiment of the present invention.

FIG. 14A is a cross-sectional view for describing one example of an arrangement of a multi-core optical fiber transmission path and a monitoring-specific core therein when each core is disposed in a hexagonal close-packed arrangement.

FIG. 14B is a cross-sectional view for describing another example of an arrangement of a multi-core optical fiber transmission path and a monitoring-specific core therein when each core is disposed in a hexagonal close-packed arrangement.

FIG. 14C is a cross-sectional view for describing still another example of an arrangement of a multi-core optical fiber transmission path and a monitoring-specific core therein.

EXAMPLE EMBODIMENT

Preferable example embodiments of the present invention are described in detail with reference to drawings.

An "unused core" used in description in the specification refers to a core that is not currently used for propagation of an optical signal by a multi-core optical fiber transmission path among cores present in a multi-core optical fiber in which a plurality of cores are formed in one clad. Further, an unused core can be referred to as a "non-used core" having an exclusive meaning from a used core being used for propagation of an optical signal by a multi-core optical fiber transmission path.

First Example Embodiment

Figure 1:
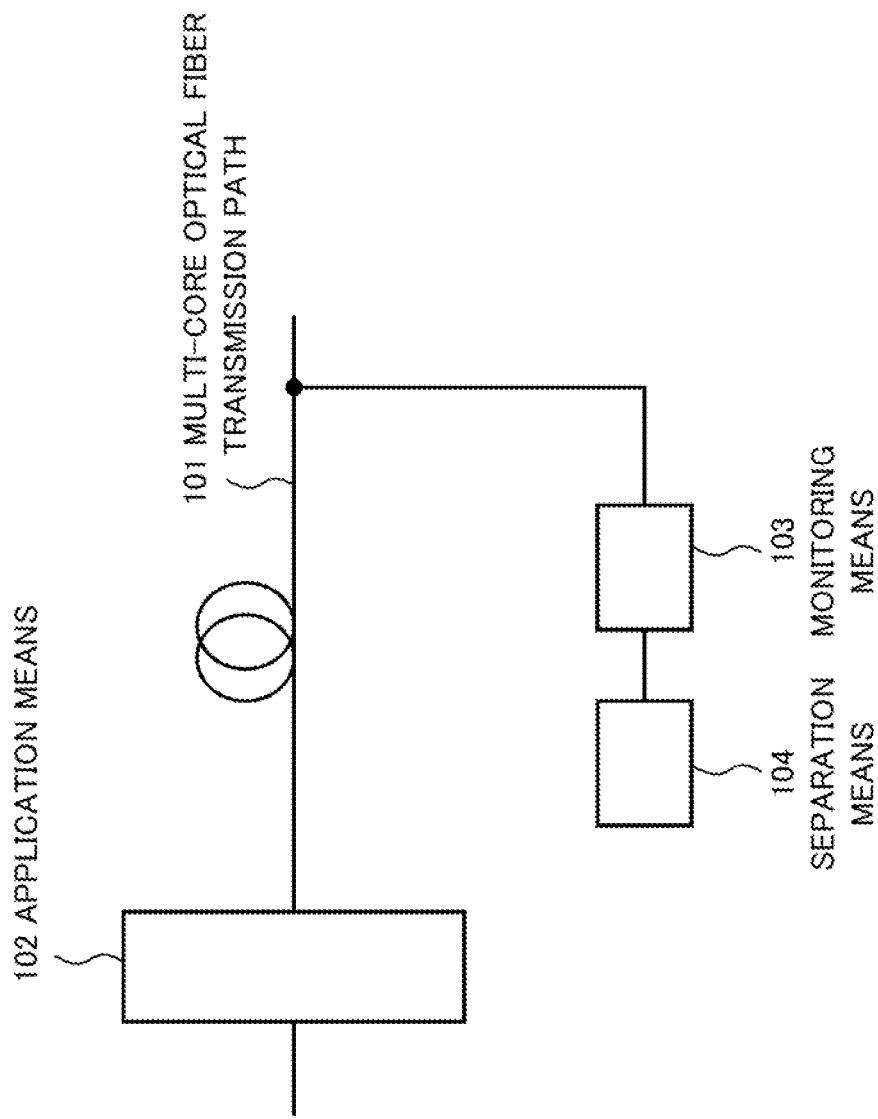
FIG. 1 is a block diagram for describing a monitoring device according to a first example embodiment of the present invention.

First, a monitoring device and a monitoring method according to a first example embodiment of the present invention will be described. FIG. 1 is a block diagram for describing the monitoring device according to the first example embodiment of the present invention.

The monitoring device according to the first example embodiment is a monitoring device for a multi-core optical fiber transmission path using a multi-core optical fiber including a plurality of cores in one clad. The monitoring device in FIG. 1 is a monitoring device of a multi-core optical fiber transmission path 101 including a plurality of used cores and at least one or more unused cores. Furthermore, the monitoring device in FIG. 1 includes an application means 102 for applying dither to the used core, a monitoring means 103 for monitoring power of the unused core, and a separation means 104 for separating a monitoring result of the monitoring means 103 into a power component from the plurality of used cores.

The application means 102 applies dither information to an optical signal propagating through a core of a multi-core optical fiber. The dither information is used for separation into a power component by the separation means 104. The monitoring means 103 monitors power of an unused core of the multi-core optical fiber transmission path located downstream of the application means 102. The separation means 104 separates a monitoring result of the monitoring means 103 into a power component from the plurality of used cores by using the applied dither information.

A component in which an optical signal propagating through a core in one clad leaks outside the core causes crosstalk for an optical signal propagating through another core. There are classifications of coupling multi-core optical fibers and non-coupling multi-core optical fibers, but a measure against crosstalk between cores is desired regardless of a classification of a coupling or non-coupling multi-core optical fiber. In the present example embodiment, power of an unused core of a multi-core optical fiber is monitored. A component in which an optical signal propagating through each core in one clad leaks outside each core is reflected in the monitored power of the unused core. Separation into a power component from the plurality of used cores is performed by using dither information applied to an optical signal propagating through a core of a multi-core optical fiber, and information related to power of the plurality of used cores in one clad is acquired.

According to the present example embodiment, a monitoring device and a monitoring method that can handle an increase in core number of a multi-core optical fiber transmission path and are suitable for crosstalk monitoring can be achieved. The reason is that, even when a monitoring part is not disposed for each used core of a multi-core optical fiber as in the background art, information related to power of a plurality of used cores can be acquired.

Second Example Embodiment

Figure 2:
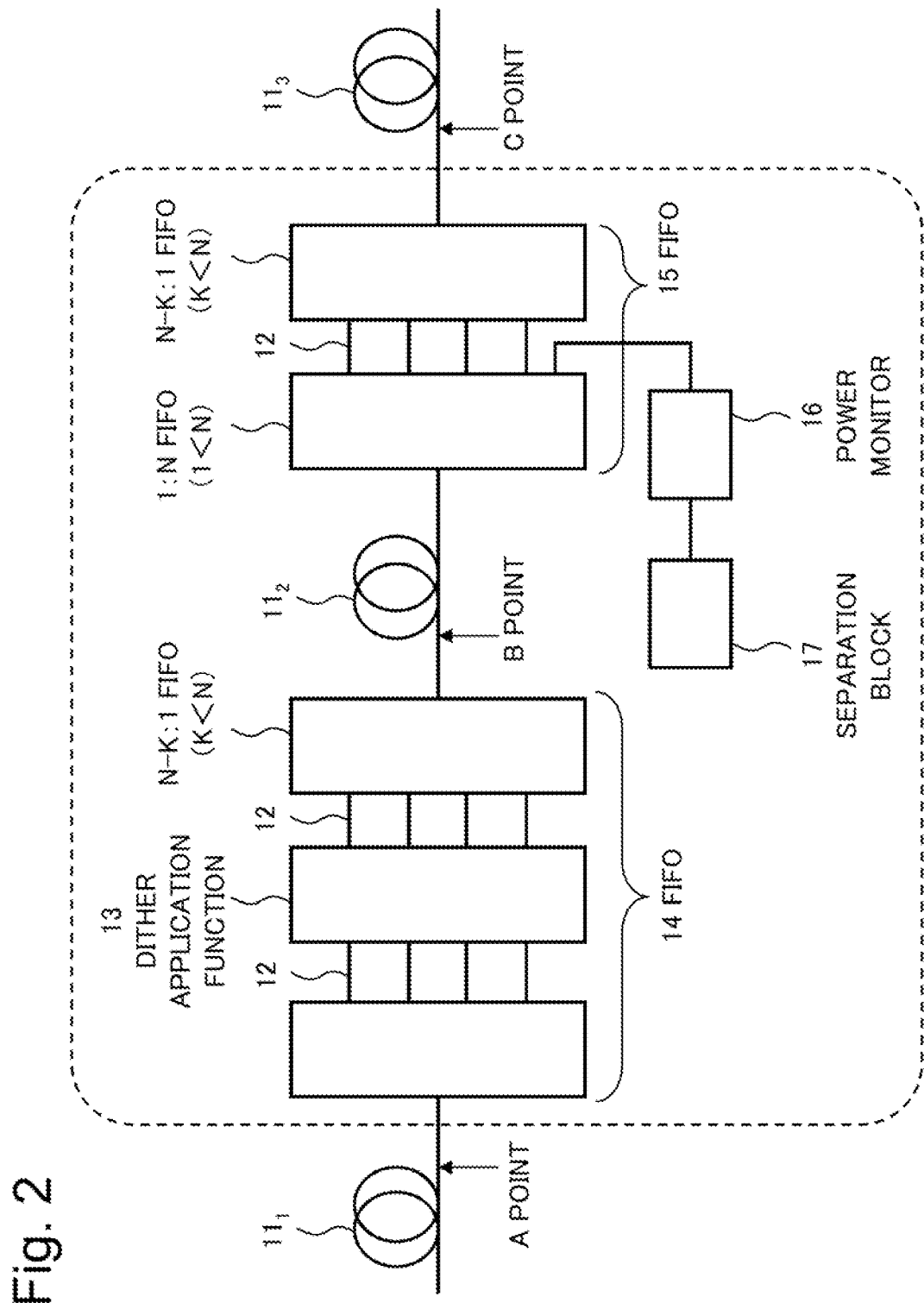
FIG. 2 is a block diagram for describing a monitoring device, an optical amplifier, and an optical transmission system according to a second example embodiment of the present invention.
Figure 3:
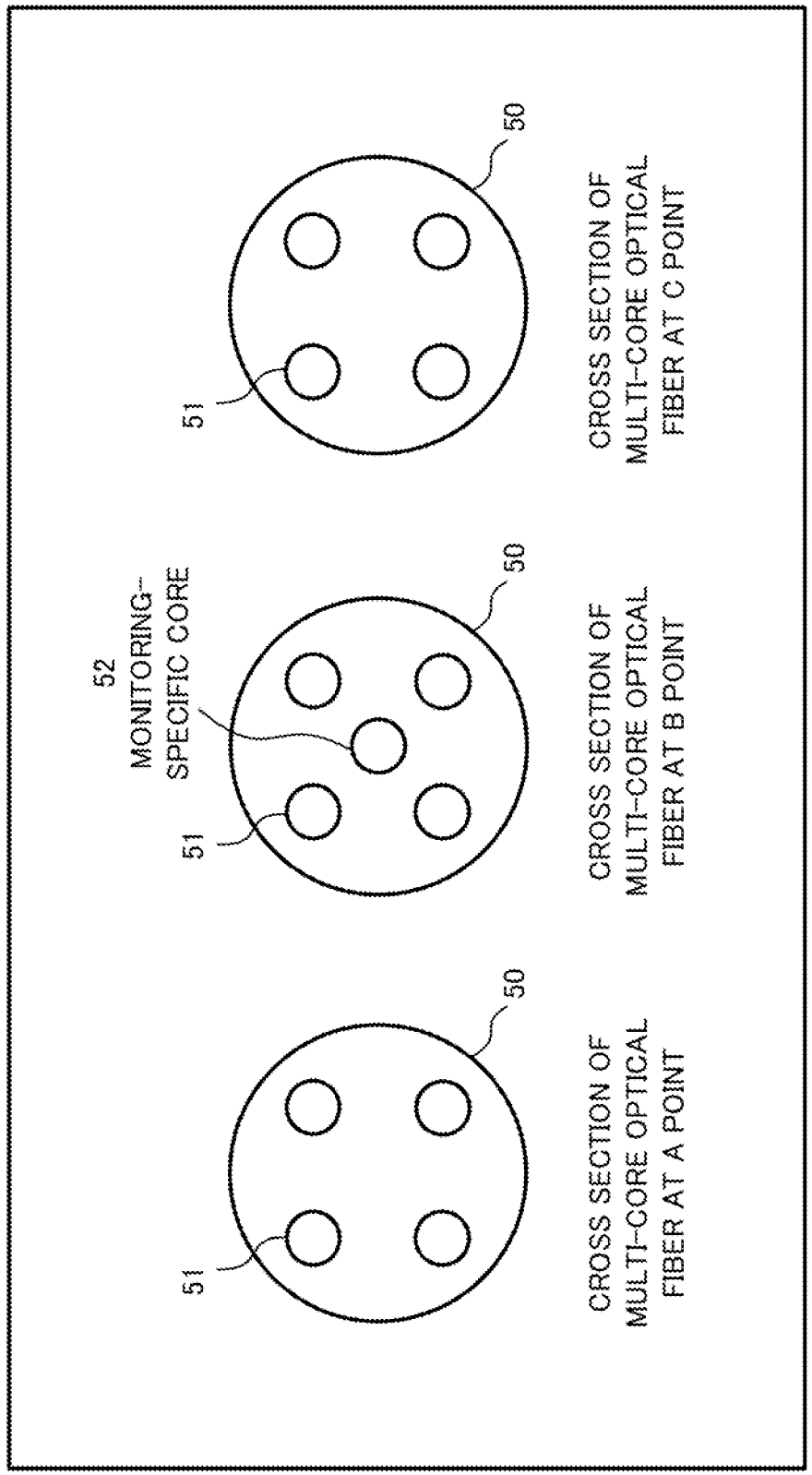
FIG. 3 is a cross-sectional view for describing a configuration of a multi-core optical fiber of a multi-core optical fiber transmission path in FIG. 2.

Next, a monitoring device, a monitoring method, an optical amplifier, and an optical transmission system according to a second example embodiment of the present invention will be described. FIG. 2 is a block diagram for describing the monitoring device, the optical amplifier, and the optical transmission system according to the second example embodiment of the present invention. FIG. 3 is a cross-sectional view for describing a configuration of a multi-core optical fiber of a multi-core optical fiber transmission path in FIG. 2.

The present example embodiment relates to the monitoring device and the monitoring method acquired by further embodying the monitoring device and the monitoring method according to the first example embodiment described above, and relates to the optical amplifier and the optical transmission system to which the monitoring device and the monitoring method are applied.

The monitoring device according to the second example embodiment is a monitoring device for a multi-core optical fiber transmission path using a multi-core optical fiber including a plurality of cores in one clad. The monitoring device included in FIG. 2 is a monitoring device for an optical signal propagating through multi-core optical fiber transmission paths $11_1$, $11_2$, and $11_3$ including a plurality of used cores.

Note that, in the present example embodiment, as one example, description is given on an assumption that a core number of the multi-core optical fiber transmission path $11_1$ is four, a core number of the multi-core optical fiber transmission path $11_2$ is five including a monitoring-specific core, and a core number of the multi-core optical fiber transmission path $11_3$ is four, but a core number of a multi-core optical fiber transmission path to which the present invention can be applied is not limited thereto. A cross-sectional view of the multi-core optical fiber transmission paths $11_1$, $11_2$, and $11_3$ at an A point, a B point, and a C point in FIG. 2 is illustrated in FIG. 3. Four cores 51 are disposed in a square arrangement in a clad 50 in the multi-core optical fiber transmission path $11_1$, the four cores 51 are disposed in a square arrangement in the clad 50 and an unused core disposed at the center is also used as a monitoring-specific core 52 in the multi-core optical fiber transmission path $11_2$, and the four cores 51 are disposed in a square arrangement in the clad 50 in the multi-core optical fiber transmission path $11_3$. FIG. 3 illustrates an arrangement of a representative core of a multi-core optical fiber transmission path including a plurality of cores in one clad, but an arrangement of cores is not limited thereto.

Furthermore, the monitoring device included in FIG. 2 includes a dither application function 13 of applying dither to a used core of the multi-core optical fiber transmission path $11_1$, a power monitor 16 that monitors power of an unused core of the multi-core optical fiber transmission path $11_2$, and a separation block 17 that separates a monitoring result of the power monitor 16 into a power component from the plurality of used cores of the multi-core optical fiber transmission path $11_2$.

In the present example embodiment, a fan-in/fan-out device (FIFO device) is used as a specific configuration for applying dither to a used core of a multi-core optical fiber transmission path, and as a specific configuration for using an unused core of a multi-core optical fiber transmission path as a monitoring-specific core (for monitoring power of an unused core). A FIFO device 14 is inserted between the multi-core optical fiber transmission path $11_1$ and the multi-core optical fiber transmission path $11_2$, and a FIFO device 15 is inserted between the multi-core optical fiber transmission path $11_2$ and the multi-core optical fiber transmission path $11_3$.

The FIFO device 14 includes four single-mode fibers 12, and the dither application function 13 of applying dither to a used core of the single-mode fiber 12. The FIFO device 14 splits the multi-core optical fiber transmission path $11_1$ having the core number of four into four single-mode fibers, also causes the dither application function 13 to be able to apply dither to an optical signal propagating through the used core of the multi-core optical fiber transmission path $11_1$ for each of the single-mode fibers 12, and further connects the four single-mode fibers 12 to the four cores of the multi-core optical fiber transmission path $11_2$.

The FIFO device 15 includes four single-mode fibers 12. The FIFO device 15 splits the multi-core optical fiber transmission path $11_2$ having the core number of five including the monitoring-specific core into five single-mode fibers 12, and also connects the four single-mode fibers 12 used for propagation of the optical signal to the four cores of the multi-core optical fiber transmission path $11_3$. Power of a single-mode fiber that is the unused core of the multi-core optical fiber transmission path $11_2$ and is associated with the monitoring-specific core in the present example embodiment among the five single-mode fibers 12 split from the FIFO device 15 is provided to the power monitor 16.

Design may be performed in such a way that a coupling portion of the FIFO device 14 to the multi-core optical fiber transmission path $11_2$ functions as N−K:1 FIFO (K<N), a coupling portion of the FIFO device 15 to the multi-core optical fiber transmission path $11_2$ functions as 1:N FIFO (1<N), and a coupling portion of the FIFO device 15 to the multi-core optical fiber transmission path $11_3$ functions as N−K:1 FIFO (K<N). Here, N is the number of the core of the multi-core optical fiber transmission path $11_2$, N−K is the number of the used core of the multi-core optical fiber transmission path $11_2$, and K is the number of the unused core of the multi-core optical fiber transmission path $11_2$.

The multi-core optical fiber transmission path $11_2$ in FIG. 2 can include an optical fiber amplifier that amplifies signal intensity of an optical signal. As the optical fiber amplifier that amplifies signal intensity of an optical signal, there is an optical fiber amplifier that amplifies signal intensity of an optical signal by inputting, to a rare-earth additive fiber to which the optical signal is input, pumping light output from a pumping light source. For example, a structure in which erbium (Er) as one example of a rare-earth element is added to a core portion of a fiber is known. A multi-core optical fiber transmission path including an optical fiber amplifier serves as an optical amplifier for an optical signal propagating through a multi-core optical fiber.

Operation

Hereinafter, an operation of the monitoring device, and the monitoring method according to the present example embodiment will be described. The dither application function 13 applies dither information to an optical signal propagating through a core of a multi-core optical fiber transmission path. The dither information is used for separation into a power component by the separation block 17. The power monitor 16 monitors power of an unused core of the multi-core optical fiber transmission path located downstream of the dither application function 13, which is the multi-core optical fiber transmission path $11_2$ in FIG. 2. Note that a photoelectric conversion means (not illustrated) for converting an optical signal from an unused core into an electric signal is assumed to be provided on a prior stage of the power monitor 16, but description thereof will be omitted. The separation block 17 separates a monitoring result of the power monitor 16 into a power component from the plurality of used cores by using the dither information applied by the dither application function 13. Next, a method of separation into a power component from the plurality of used cores by using dither information will be described. Note that a case where the number of a used core of a multi-core optical fiber is four will also be described here, but the present invention can be applied without being limited to this number.

In a case of a multi-core optical fiber having the number of a used core of N, power $P_{mon}$ of the unused core of the multi-core optical fiber transmission path $11_2$ monitored by the power monitor 16 in the present example embodiment can be expressed as $P_1X_1+P_2X_2+P_3X_3+ \ldots +P_NX_N=P_{mon}$. Here, it is assumed that $P_1$, $P_2$, $P_3$, and $P_N$ indicate intensity of light leaking from a used core (used core 1, used core 2, used core 3, . . . , and used core N), and $X_1$, $X_2$, $X_3$, . . . , and $X_N$ reflect an intrinsic coefficient determined by a design specification of a multi-core optical fiber such as a pitch between the used core (used core 1, used core 2, used core 3, . . . , and used core N) and the unused core with respect to intensity of a propagating optical signal.

In a case of a configuration as illustrated in FIG. 2 in which the number of the used core of the multi-core optical fiber is four, the power $P_{mon}$ of the unused core of the multi-core optical fiber transmission path $11_2$ monitored by the power monitor 16 can be expressed as $P_1X_1+P_2X_2+P_3X_3+P_4X_4=P_{mon}$. Here, it is assumed that $P_1$ to $P_4$ indicate intensity of light leaking from the used core (used core 1 to used core 4), and $X_1$ to $X_4$ reflect an intrinsic coefficient determined by a design specification of a multi-core optical fiber such as a pitch between the used core (used core 1 to used core 4) and the unused core with respect to intensity of a propagating optical signal.

In a case of a configuration in which the number of a used core of a multi-core optical fiber is four, when power of an unused core at a time 1 is $P_{mon1}$, power of an unused core at a time 2 is $P_{mon2}$, power of an unused core at a time 3 is $P_{mon3}$, and power of an unused core at a time 4 is $P_{mon4}$ in order to separate a monitoring result of the power monitor 16 into a power component for each of a plurality of used cores, the power $P_{mon1}$ to $P_{mon4}$ of the unused cores at the time 1 to the time 4 can be described as follows by further using coefficients a to p.

Time 1: $aP_1X_1+bP_2X_2+cP_3X_3+dP_4X_4=P_{mon1}$

Time 2: $eP_1X_1+fP_2X_2+gP_3X_3+hP_4X_4=P_{mon2}$

Time 3: $iP_1X_1+jP_2X_2+kP_3X_3+lP_4X_4=P_{mon3}$

Time 4: $mP_1X_1+nP_2X_2+oP_3X_3+pP_4X_4=P_{mon4}$

Four equations related to the power $P_{mon1}$ to $P_{mon4}$ of the unused cores at the time 1 to the time 4 are collectively described into forms of determinants as illustrated in FIG. 4. Separation into a power component of a plurality of used cores is equivalent to solving the determinants in FIG. 4 for intensity $P_1$ to $P_4$ of light leaking from a used core (used core 1 to used core 4). A method of separation into a power component from the plurality of used cores by using dither information will be described.

For example, the dither application function 13 applies a value different from others to one used core among the used core 1 to the used core 4. For example, a value different from other used cores is applied to only one used core among the used cores in such a way that 1 is applied to the used cores 1 to 3 and 0.95 is applied to the used core 4 at the time 1, and the power $P_{mon1}$ of the unused core at this time (time 1) is monitored. Furthermore, a value different from other used cores is applied to only one used core among the used cores in such a way that 1 is applied to the used cores 1, 2, and 4 and 0.95 is applied to the used core 3 at the time 2, and the power $P_{mon2}$ of the unused core at this time (time 2) is monitored. Furthermore, a value different from other used cores is applied to only one used core among the used cores in such a way that 1 is applied to the used cores 1, 3 and 4 and 0.95 is applied to the used core 2 at the time 3, and the power $P_{mon3}$ of the unused core at this time (time 3) is monitored. Furthermore, a value different from other used cores is applied to only one used core among the used cores in such a way that 1 is applied to the used cores 2 to 4 and 0.95 is applied to the used core 1 at the time 4, and the power $P_{mon4}$ of the unused core at this time (time 4) is monitored. Then, the intensity $P_1$ to $P_4$ of light leaking from the used core (used core 1 to used core 4) is recognized, by separating a power component from a plurality of used cores, and by using the power $P_{mon1}$ to $P_{mon4}$ of the known unused cores being monitored in such a manner, $X_1$ to $X_4$ determined by intensity of a propagating optical signal and the like.

FIG. 5 is a determinant for describing a relationship between dither application by the dither application function 13 and calculation of a crosstalk amount. FIG. 6 is a schematic diagram for describing a relationship between one example of more specific dither application and one example of a determinant at that time. Separation into a power component from a plurality of used cores is not limited to a relationship between the numerical values described above. For example, as in FIG. 6, a value different from other used cores may be applied to only one used core among the used cores in such a way that 1.05 is applied to the used core 1 and 1 is applied to the used cores 2 to 4 at the time 1, and the power $P_{mon1}$ of the unused core at this time (time 1) may be monitored. A value different from other used cores may be applied to only one used core among the used cores in such a way that 1.05 is applied to the used core 2 and 1 is applied to the used cores 1, 3, and 4 at the time 2, and the power $P_{mon2}$ of the unused core at this time (time 2) may be monitored. A value different from other used cores may be applied to only one used core among the used cores in such a way that 1.05 is applied to the used core 3 and 1 is applied to the used cores 1, 2, and 4 at the time 3, and the power $P_{mon3}$ of the unused core at this time (time 3) may be monitored. A value different from other used cores may be applied to only one used core among the used cores in such a way that 1.05 is applied to the used core 4 and 1 is applied to the used cores 1 to 3 at the time 4, and the power $P_{mon4}$ of the unused core at this time (time 4) may be monitored. Separation into a power component from the plurality of used cores may be performed, and the intensity $P_1$ to $P_4$ of light leaking from the used cores (used core 1 to used core 4) may be recognized.

Advantageous Effect of Example Embodiment

According to the present example embodiment, similarly to the first example embodiment, the monitoring device and the monitoring method that can handle an increase in core number of a multi-core optical fiber transmission path and are suitable for crosstalk monitoring can be achieved. The reason is that, even when a monitoring part is not disposed for each used core of a multi-core optical fiber as in the background art, information related to power of a plurality of used cores can be acquired.

The separation block 17 can separate a monitoring result of the power monitor 16 into a power component from the plurality of used cores by using the dither information applied by the dither application function 13. Then, light intensity for each of the plurality of used cores can be recognized, by a monitoring result of the single power monitor 16 and by separating into a power component from a plurality of used cores of a multi-core optical fiber transmission path. Note that information about the light intensity for each of the plurality of used cores that can be recognized in such a manner can be used as necessary for gain control of the optical fiber amplifier included in the multi-core optical fiber transmission path $11_2$, and the like.

In the optical amplifier and the optical transmission system to which the monitoring device and the monitoring method according to the present example embodiment are applied, even when a monitoring part is not disposed for each used core of a multi-core optical fiber as in the background art, information related to power of a plurality of used cores can be acquired, and thus space saving can be achieved.

Third Example Embodiment

Next, a monitoring device, a monitoring method, an optical amplifier, and an optical transmission system according to a third example embodiment of the present invention will be described. FIG. 7 is a block diagram for describing the monitoring device, the optical amplifier, and the optical transmission system according to the third example embodiment of the present invention.

The present example embodiment relates to the monitoring device and the monitoring method acquired by further embodying the monitoring device and the monitoring method according to the first example embodiment and the second example embodiment described above, and relates to a configuration associated with monitoring of power of an unused core of a multi-core optical fiber transmission path $11_2$ by a power monitor 16, separation into a power component from a plurality of used cores by a separation block 17, and application of dither by a dither application function 13.

In the present example embodiment, description is given on an assumption that the number of a used core of a multi-core optical fiber transmission path is four, and the number of an unused core of the multi-core optical fiber transmission path is one.

Similarly to the first example embodiment and the second example embodiment, the monitoring device according to the third example embodiment is a monitoring device for a multi-core optical fiber transmission path using a multi-core optical fiber including a plurality of cores in one clad. The monitoring device included in FIG. 7 is a monitoring device for an optical signal propagating through multi-core optical fiber transmission paths $11_1$, $11_2$, and $11_3$ including a plurality of used cores.

Note that, in the present example embodiment, a core number of the multi-core optical fiber transmission path $11_1$ is four, a core number of the multi-core optical fiber transmission path $11_2$ is five including a monitoring-specific core, and a core number of the multi-core optical fiber transmission path $11_3$ is four.

Furthermore, similarly to the second example embodiment, the monitoring device included in FIG. 7 includes the power monitor 16 that monitors power of the unused core of the multi-core optical fiber transmission path $11_2$, and the separation block 17 that separates a monitoring result of the power monitor 16 into a power component from the plurality of used cores of the multi-core optical fiber transmission path $11_2$.

Also in the present example embodiment, similarly to the second example embodiment, a fan-in/fan-out device (FIFO device) is used as a specific configuration for applying dither to a used core of a multi-core optical fiber transmission path, and as a specific configuration for using an unused core of a multi-core optical fiber transmission path as a monitoring-specific core (for monitoring power of an unused core). A FIFO device 14 is inserted between the multi-core optical fiber transmission path $11_1$ and the multi-core optical fiber transmission path $11_2$, and a FIFO device 15 is inserted between the multi-core optical fiber transmission path $11_2$ and the multi-core optical fiber transmission path $11_3$.

The FIFO device 14 includes four single-mode fibers, and an optical coupler 21 for applying dither to a used core of the single-mode fiber. The FIFO device 14 splits the multi-core optical fiber transmission path $11_1$ having the core number of four into four single-mode fibers, also causes the optical coupler 21 to be able to apply dither to an optical signal propagating through the used core of the multi-core optical fiber transmission path for each of the single-mode fibers, and further connects the four single-mode fibers to the four cores of the multi-core optical fiber transmission path $11_2$.

The FIFO device 15 includes four single-mode fibers. The FIFO device 15 splits the multi-core optical fiber transmission path $11_2$ having the core number of five including the monitoring-specific core into five single-mode fibers, and also connects the four single-mode fibers used for propagation of the optical signal to the four cores of the multi-core optical fiber transmission path $11_3$. Power of a single-mode fiber that is the unused core of the multi-core optical fiber transmission path $11_2$ and is associated with the monitoring-specific core in the present example embodiment among the five single-mode fibers split from the FIFO device 15 is provided to the power monitor 16.

Design may be performed in such a way that a coupling portion of the FIFO device 14 to the multi-core optical fiber transmission path $11_2$ functions as 4:1 FIFO, a coupling portion of the FIFO device 15 to the multi-core optical fiber transmission path $11_2$ functions as 1:5 FIFO, and a coupling portion of the FIFO device 15 to the multi-core optical fiber transmission path $11_3$ functions as 4:1 FIFO.

The monitoring device included in FIG. 7 further includes a laser diode 20 (LD 20) that provides pumping light to the optical coupler 21, a driver 19 that drives the LD 20, and a controller 18 that controls the driver 19.

Similarly to the second example embodiment, the multi-core optical fiber transmission path $11_2$ in FIG. 7 can include an optical fiber amplifier that amplifies signal intensity of an optical signal. A multi-core optical fiber transmission path including an optical fiber amplifier serves as an optical amplifier for an optical signal propagating through a multi-core optical fiber.

Operation

Hereinafter, an operation of the monitoring device, and the monitoring method according to the present example embodiment will be described. The controller 18, the driver 19, the LD 20, and the optical coupler 21 apply dither information to an optical signal propagating through a core of a multi-core optical fiber. The dither information is used for separation into a power component by the separation block 17. The power monitor 16 monitors power of an unused core of the multi-core optical fiber transmission path located downstream of the optical coupler 21 constituting a dither application function, which is the multi-core optical fiber transmission path $11_2$ in FIG. 7. The separation block 17 separates a monitoring result of the power monitor 16 into a power component from the plurality of used cores by using the dither information applied by the optical coupler 21 constituting the dither application function.

A method of separation into a power component from the plurality of used cores by using dither information is similar to the technique in the second example embodiment. For example, as in FIG. 6, a value different from other used cores is applied to only one used core among the used cores in such a way that 1.05 is applied to the used core 1 and 1 is applied to the used cores 2 to 4 at the time 1, and the power $P_{mon1}$ of the unused core at this time (time 1) is monitored. A value different from other used cores is applied to only one used core among the used cores in such a way that 1.05 is applied to the used core 2 and 1 is applied to the used cores 1, 3, and 4 at the time 2, and the power $P_{mon2}$ of the unused core at this time (time 2) is monitored. A value different from other used cores is applied to only one used core among the used cores in such a way that 1.05 is applied to the used core 3 and 1 is applied to the used cores 1, 2, and 4 at the time 3, and the power $P_{mon3}$ of the unused core at this time (time 3) is monitored. A value different from other used cores is applied to only one used core among the used cores in such a way that 1.05 is applied to the used core 4 and 1 is applied to the used cores 1 to 3 at the time 4, and the power $P_{mon4}$ of the unused core at this time (time 4) is monitored. The monitoring results can be separated into a power component from the plurality of used cores, and the intensity $P_1$ to $P_4$ of light leaking from the used cores (used core 1 to used core 4) can be recognized.

How the technique in the second example embodiment is achieved in the configuration in the present example embodiment illustrated in FIG. 7 will be specifically described.

First, the controller 18 adjusts the coefficients a to d of the equation of the power $P_{mon1}$ of the unused core at the time 1 described above. For a degree of the adjustment, an adjustment made by about +several % of a signal output is assumed. By reflecting the adjustment result, the driver 19 drives the LD 20, and pumping light from the LD 20 is added to an optical signal propagating through a used core of a multi-core optical fiber transmission path via the optical coupler 21. Then, a monitoring value of the power $P_{mon1}$ of the unused core at the time 1 is recorded. Subsequently, the coefficients e to h of the equation of the power $P_{mon2}$ of the unused core at the time 2 are adjusted, and a monitoring value of the power $P_{mon2}$ of the unused core at the time 2 is recorded. Subsequently, the coefficients i to l of the equation of the power $P_{mon3}$ of the unused core at the time 3 are adjusted, and a monitoring value of the power $P_{mon3}$ of the unused core at the time 3 is recorded. Subsequently, the coefficients m to p of the equation of the power $P_{mon4}$ of the unused core at the time 4 are adjusted, and a monitoring value of the power $P_{mon4}$ of the unused core at the time 4 is recorded. Similarly to the second example embodiment, a monitoring value of power of an unused core at each time N is recorded by creating an observation state at a different time N by a number N of a used core in a multi-core optical fiber. From the results, a signal output value of the plurality of used cores is calculated, by separating into a power component from a plurality of used cores, and by using the power $P_{mon1}$ to $P_{mon4}$ of the known unused cores being monitored in such a manner, $X_1$ to $X_4$ determined by intensity of a propagating optical signal and the like.

Whether a signal output value of each used core is a desired value or whether a signal output value of each used core falls within an allowable range is confirmed as necessary. When a signal output value of each used core deviates from a desired value or falls outside an allowable range, an excess/deficiency value is recorded as necessary, and an adjustment to the coefficients a to p, recording of a monitoring value of power of an unused core, and calculation of a signal output value of a plurality of used cores are repeated in consideration of the excess/deficiency value.

Advantageous Effect of Example Embodiment

According to the present example embodiment, similarly to the first example embodiment and the second example embodiment, the monitoring device and the monitoring method that can handle an increase in core number of a multi-core optical fiber transmission path and are suitable for crosstalk monitoring can be achieved. The reason is that, even when a monitoring part is not disposed for each used core of a multi-core optical fiber as in the background art, information related to power of a plurality of used cores can be acquired.

Similarly to the second example embodiment, the separation block 17 can separate a monitoring result of the power monitor 16 into a power component from the plurality of used cores by using the applied dither information. A monitoring result of the single power monitor 16 can be separated into a power component from a plurality of used cores of a multi-core optical fiber transmission path, and light intensity for each of the plurality of used cores can be recognized. Note that information about the light intensity for each of the plurality of used cores that can be recognized in such a manner can be appropriately used for gain control of the optical fiber amplifier included in the multi-core optical fiber transmission path $11_2$, and the like.

Furthermore, in the present example embodiment, light intensity for each of a plurality of used cores can be recognized, and thus whether a signal output value of each used core is a desired value or whether a signal output value of each used core falls within an allowable range can be confirmed. When a signal output value of each used core is not a desired value or a signal output value of each used core does not fall within an allowable range, an alarm can be raised. When a signal output value of each used core is not a desired value or a signal output value of each used core does not fall within an allowable range, a notification can be made to an operator of an optical amplifier and an operator of an optical transmission system. An operator of an optical amplifier and an operator of an optical transmission system can make an adjustment as necessary in such a way that a signal output value of each used core is a desired value or a signal output value of each used core falls within an allowable range.

Similarly to the first example embodiment and the second example embodiment, in the optical amplifier and the optical transmission system to which the monitoring device and the monitoring method according to the present example embodiment are applied, even when a monitoring part is not disposed for each used core of a multi-core optical fiber as in the background art, information related to power of a plurality of used cores can be acquired, and thus space saving can be achieved.

Modification Example of Third Example Embodiment

Figure 8:
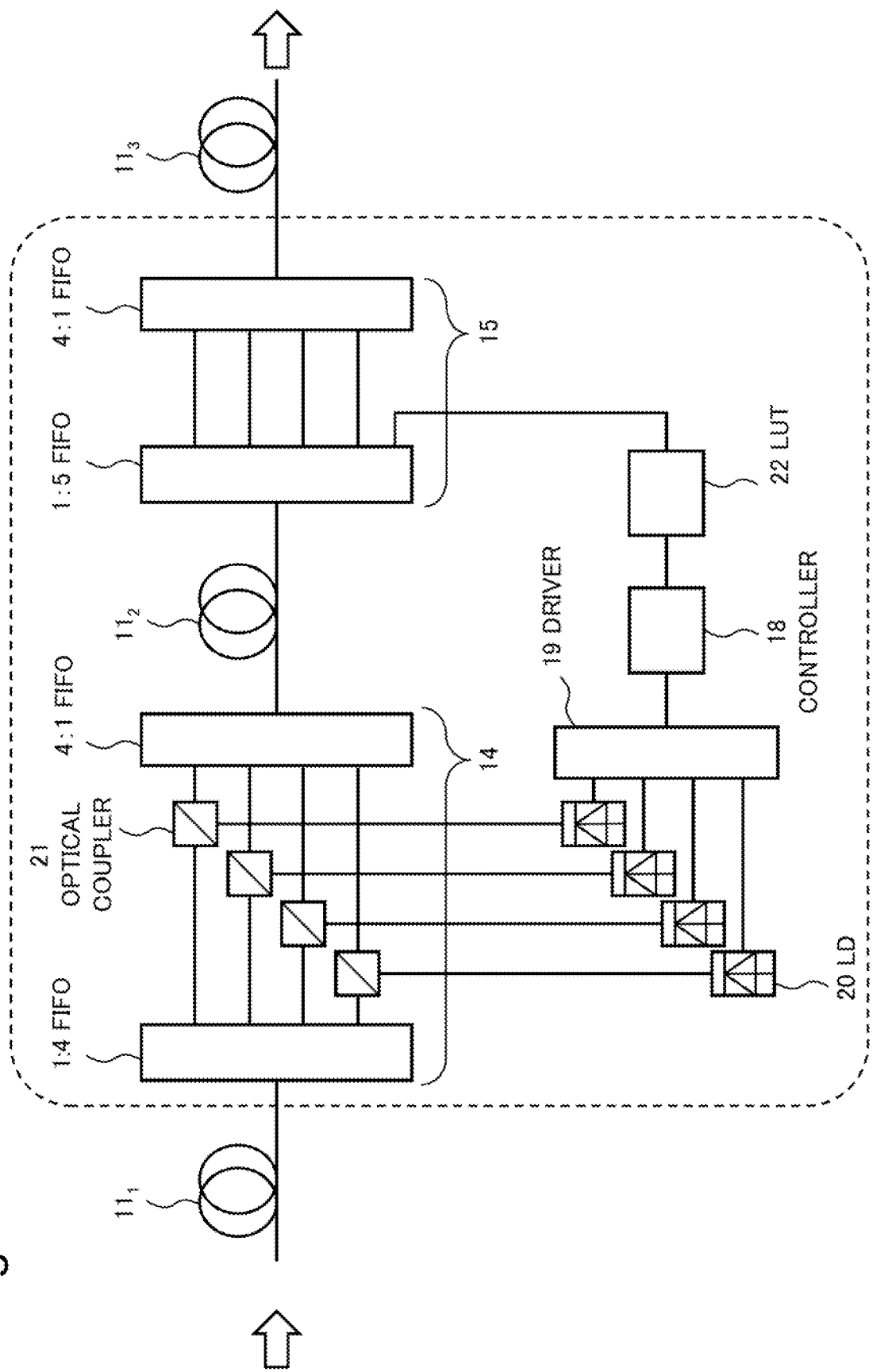
FIG. 8 is a block diagram for describing a monitoring device, an optical amplifier, and an optical transmission system according to a modification example of the third example embodiment of the present invention.
Figure 9:
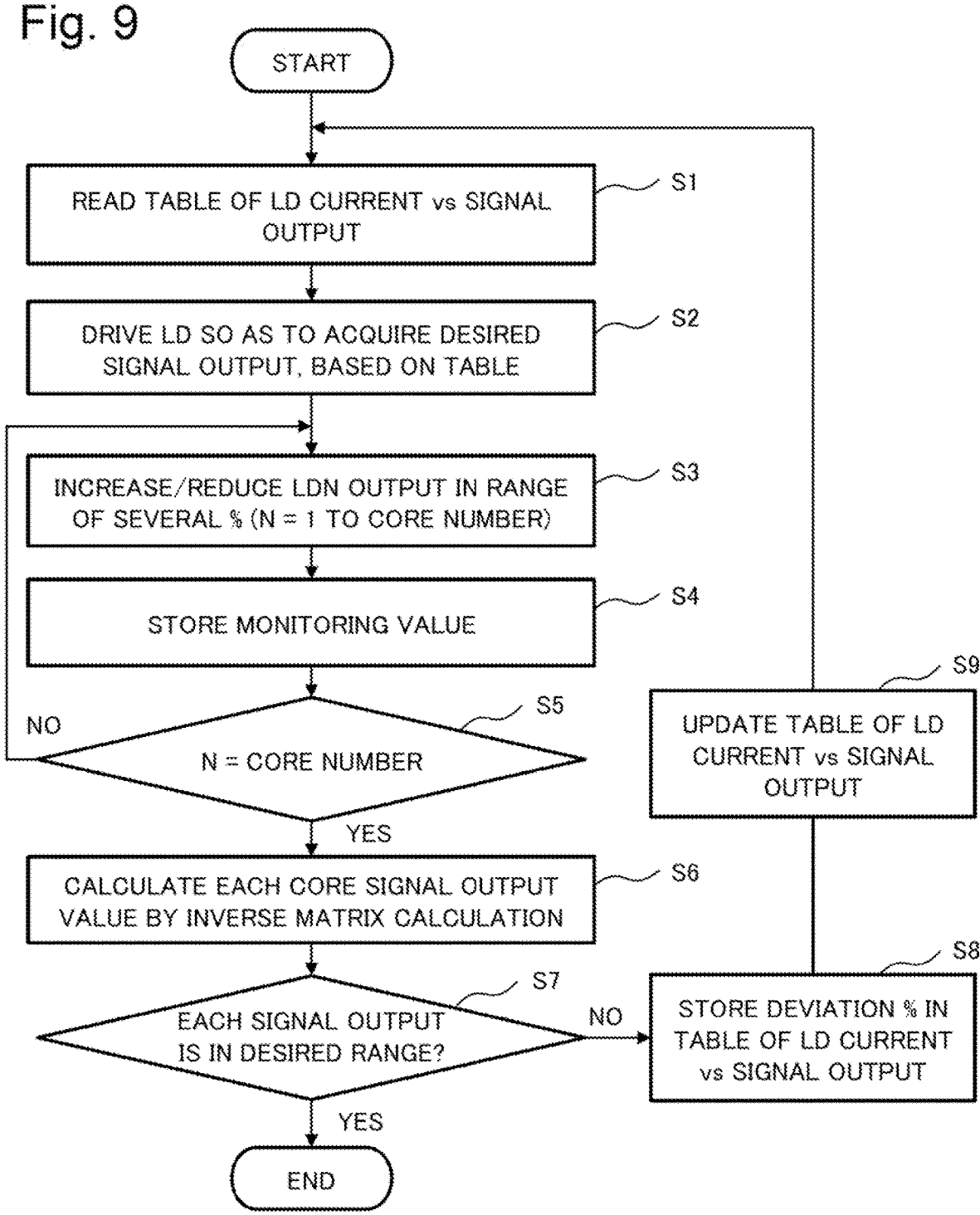
FIG. 9 is a flowchart for describing an operation of the monitoring device in FIG. 8.

Next, a monitoring device, a monitoring method, an optical amplifier, and an optical transmission system according to a modification example of the third example embodiment of the present invention will be described. FIG. 8 is a block diagram for describing the monitoring device, the optical amplifier, and the optical transmission system according to the modification example of the third example embodiment of the present invention. FIG. 9 is a flowchart for describing an operation of the monitoring device in FIG. 8.

In the present example embodiment, a lookup table 22 (LUT 22) is further included in the monitoring device according to the third example embodiment described above. The LUT 22 holds a current value of the LD 20 and a signal output value in pair. In the monitoring device in FIG. 8, a relationship of a matrix including dither information at the time N (time 1 to time 4) as illustrated in FIG. 6 is read from the LUT 22, and a combination of LD current control and a signal output of a core number is reproduced. Then, a signal output value of the plurality of used cores can be calculated, by separating a power component from a plurality of used cores, and by using the power $P_{mon1}$ to $P_{mon4}$ of known unused cores being monitored at each time, $X_1$ to $X_4$ determined by intensity of a propagating optical signal and the like.

An operation of the monitoring device in FIG. 8 will be described with reference to FIG. 9. First, a table is read from the LUT 22 that holds a current value of the LD 20 and a signal output value in pair (S1). Next, the LD 20 is driven in such a way that the signal output is a desired value, based on the read table (S2). An output of the LD 20 is increased and reduced in a range of several % in association with dither information (S3). A monitoring value of the power $P_{mon}$ of an unused core at this time is stored (S4). The power $P_{mon1}$ to $P_{monN}$ of the unused core is stored by being repeated by a number N of a used core. A signal output value of each core is calculated by inverse calculation (S6). Next, whether the signal output value of each used core is a desired value or whether the signal output value of each used core falls within an allowable range is confirmed (S7). When the signal output value of each used core is not a desired value or does not fall within the allowable range, an excess/deficiency value is stored in the LUT 22 that holds the current value and the signal output value in pair (S8). By reflecting the excess/deficiency value, a relationship between the current value and the signal output value being held by the LUT 22 is updated (S9).

According to the modification example of the third example embodiment, an Advantageous effect similar to that in the third example embodiment described above can be acquired. Furthermore, labor to adjust a signal output value of each used core can be reduced by using the LUT 22 that holds a current value of the LD 20 and the signal output value.

Fourth Example Embodiment

Next, a monitoring device, a monitoring method, an optical amplifier, and an optical transmission system according to a fourth example embodiment of the present invention will be described.

Figure 10:
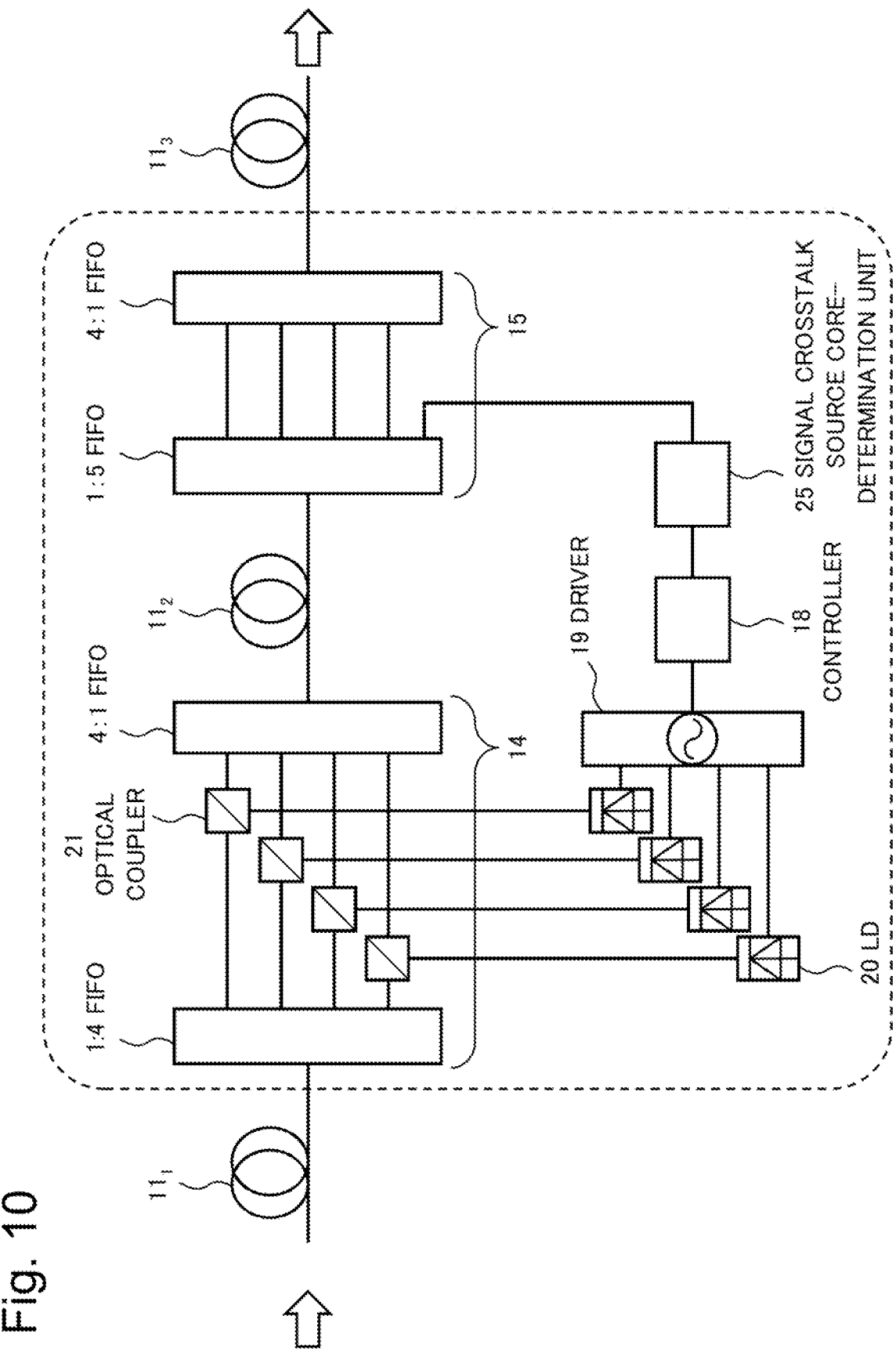
FIG. 10 is a block diagram for describing a monitoring device, an optical amplifier, and an optical transmission system according to a fourth example embodiment of the present invention.

FIG. 10 is a block diagram for describing the monitoring device, the optical amplifier, and the optical transmission system according to the fourth example embodiment of the present invention. The present example embodiment relates to an improvement in the monitoring device and the monitoring method according to the third example embodiment described above. In the second example embodiment and the third example embodiment, the equations indicating the power $P_{mon1}$ of the unused core at the time 1, the power $P_{mon2}$ of the unused core at the time 2, the power $P_{mon3}$ of the unused core at the time 3, and the power $P_{mon4}$ of the unused core at the time 4 are described with, as the premise, the equation $(P_1X_1+P_2X_2+P_3X_3+\ldots+P_NX_N=P_{mon})$ indicating the power $P_{mon}$ of the unused core of the multi-core optical fiber transmission path. In the equations, as understood from the description of the third example embodiment, the coefficients a to d, the coefficients e to h, the coefficients i to l, and the coefficients m to p are a control value for controlling the monitoring device and are known. In contrast, there is a possibility that $X_1$ to $X_4$ may be subjected to a time fluctuation caused by a change in an environment in which a multi-core optical fiber transmission path to be monitored operates, such as a temperature change and a stress change, for example. In the present example embodiment, crosstalk is also monitored in addition to the configuration of the second example embodiment and the third example embodiment.

In the present example embodiment, a signal crosstalk source core-determination unit 25 is further included in addition to the configuration of the third example embodiment illustrated in FIG. 7. Here, the signal crosstalk source core-determination unit 25 includes an electric filter that extracts only a component having a specific frequency from an electric signal by passing through the component. The electric filter of the signal crosstalk source core-determination unit 25 according to the present example embodiment extracts a component having a different frequency and being provided to an optical signal of a plurality of used cores having fixed intensity. After an optical signal from an unused core being used as a monitoring-specific core of a multi-core optical fiber transmission path $11_2$ is converted into an electric signal, the electric filter of the signal crosstalk source core-determination unit 25 according to the present example embodiment extracts a component having a different frequency and being provided to an optical signal of a plurality of used cores having fixed intensity.

In the present example embodiment, dither having fixed intensity is provided to signal light incident on a plurality of used cores of a multi-core optical fiber. It is assumed that the dither having the fixed intensity is dither of about 1 kHz at a frequency different for each of the plurality of used cores, and has the same amplitude. Note that, the monitoring device in the present example embodiment is used for an optical fiber amplifier that amplifies signal intensity of an optical signal by inputting pumping light output from a pumping light source to a rare-earth additive fiver to which the optical signal is input, the frequency of the dither is set to be slow to an extent that an amplification medium can respond.

Figure 11:
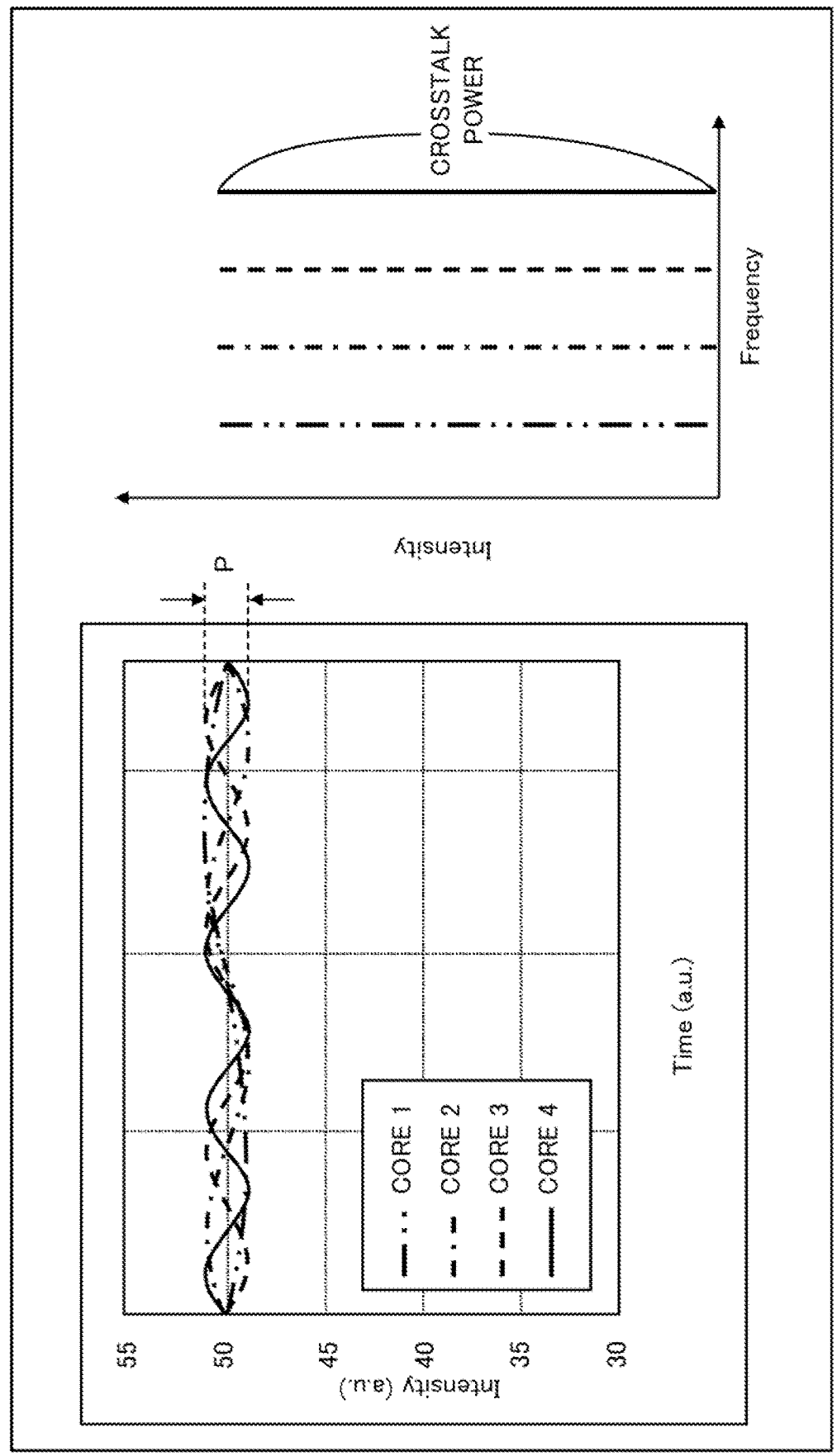
FIG. 11 is a graph illustrating a relationship between time and intensity of signal light when dither having a different frequency and fixed intensity is provided to a plurality of used cores, and a relationship between a frequency of the dither component and intensity associated with an amplitude of the dither component.

FIG. 11 is a graph illustrating a relationship between time and intensity of signal light when dither having a different frequency and fixed intensity is provided to a used core 1 to a used core 4, and a relationship between a frequency of a dither component and intensity associated with an amplitude of the dither component. The dither having a different frequency and being provided for each of a plurality of used cores is identification information that identifies the plurality of used cores.

For the sake of description, FIG. 11 indicates information related to the used core 1 by a chain double-dashed line, information related to the used core 2 by a dot-and-dash line, information related to the used core 3 by a dotted line, and information related to the used core 4 by a solid line. For example, it is assumed that dither provided to the used core 1 is a sinusoidal wave of 1 kHz, dither provided to the used core 2 is a sinusoidal wave of 2 kHz, dither provided to the used core 3 is a sinusoidal wave of 3 kHz, and dither provided to the used core 4 is a sinusoidal wave of 4 kHz, and an amplitude P thereof is the same.

In the graph indicating light intensity with respect to a frequency in FIG. 11, dither information having fixed intensity is provided, and thus light intensity appears at frequencies different from each other being provided to an optical signal of each used core. In absence of crosstalk between cores, the frequencies are observed as peaks having the same magnitude. When dither provided to the used core 1 is a sinusoidal wave of 1 kHz, dither provided to the used core 2 is a sinusoidal wave of 2 kHz, dither provided to the used core 3 is a sinusoidal wave of 3 kHz, and dither provided to the used core 4 is a sinusoidal wave of 4 kHz as described above, a peak related to the used core 1, a peak related to the used core 2, a peak related to the used core 3, and a peak related to the used core 4 appear at frequencies of 1 kHz, 2 kHz, 3 kHz, and 4 kHz. In absence of crosstalk between cores, magnitude of the peaks is the same, and thus an influence of the crosstalk can be recognized from a difference when the magnitude is not the same.

Note that, as dither at a different frequency being provided as identification information that identifies a plurality of used cores, dither at a frequency lower than a response frequency of an amplification medium of an optical amplifier is selected in consideration of a combination with the optical amplifier. By selecting such a frequency, identification information remains in an optical signal passing through an amplification medium of an optical amplifier, and a plurality of used cores can be identified.

Advantageous Effect of Example Embodiment

According to the present example embodiment, similarly to the first example embodiment described above and the like, a monitoring device and a monitoring method that can handle an increase in core number of a multi-core optical fiber transmission path and are suitable for crosstalk monitoring can be achieved.

In the present example embodiment, dither having fixed intensity is provided to signal light incident on a plurality of used cores of a multi-core optical fiber. A dither amplitude is observed in the power monitor 16 that monitors power of an unused core. Since an amplitude P of dither at a different frequency being provided for each of a plurality of used cores is fixed, a relationship between a frequency and light intensity is fixed when there is no time fluctuation in crosstalk. A change in the relationship between a frequency and light intensity represents a time fluctuation in crosstalk, and a crosstalk amount can be recognized in such a manner.

In the present example embodiment, when a time fluctuation is caused by a change in an environment in which a multi-core optical fiber transmission path to be monitored operates, such as a temperature change and a stress change, for example, crosstalk can also be monitored.

Furthermore, in the optical amplifier and the optical transmission system to which the monitoring device and the monitoring method according to the present example embodiment are applied, similarly to the second example embodiment described above and the like, even when a monitoring part is not disposed for each used core of a multi-core optical fiber as in the background art, information related to power of a plurality of used cores can be acquired, and thus space saving can be achieved.

Fifth Example Embodiment

Figure 12:
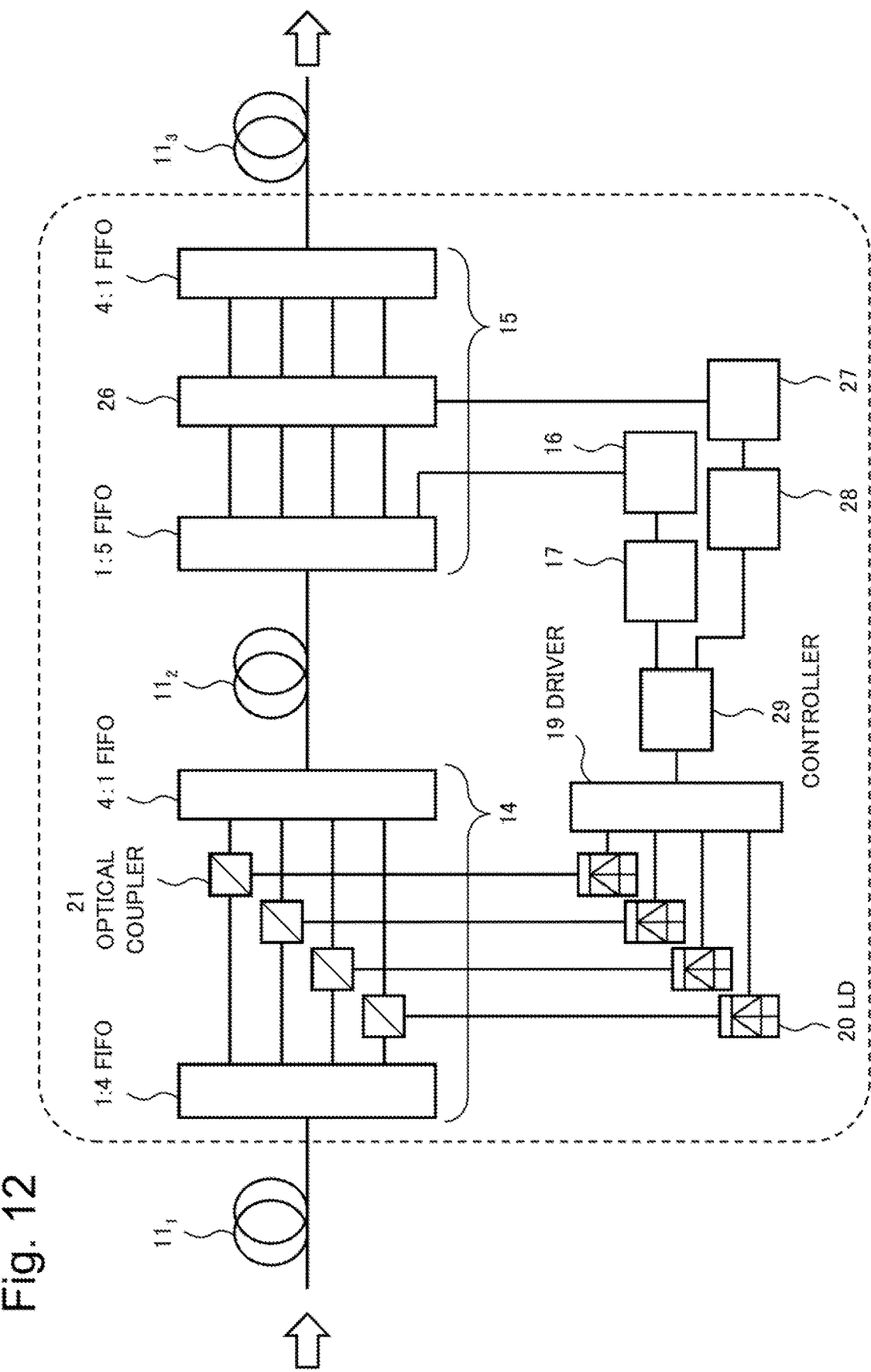
FIG. 12 is a block diagram for describing a monitoring device, an optical amplifier, and an optical transmission system according to a fifth example embodiment of the present invention.
Figure 13:
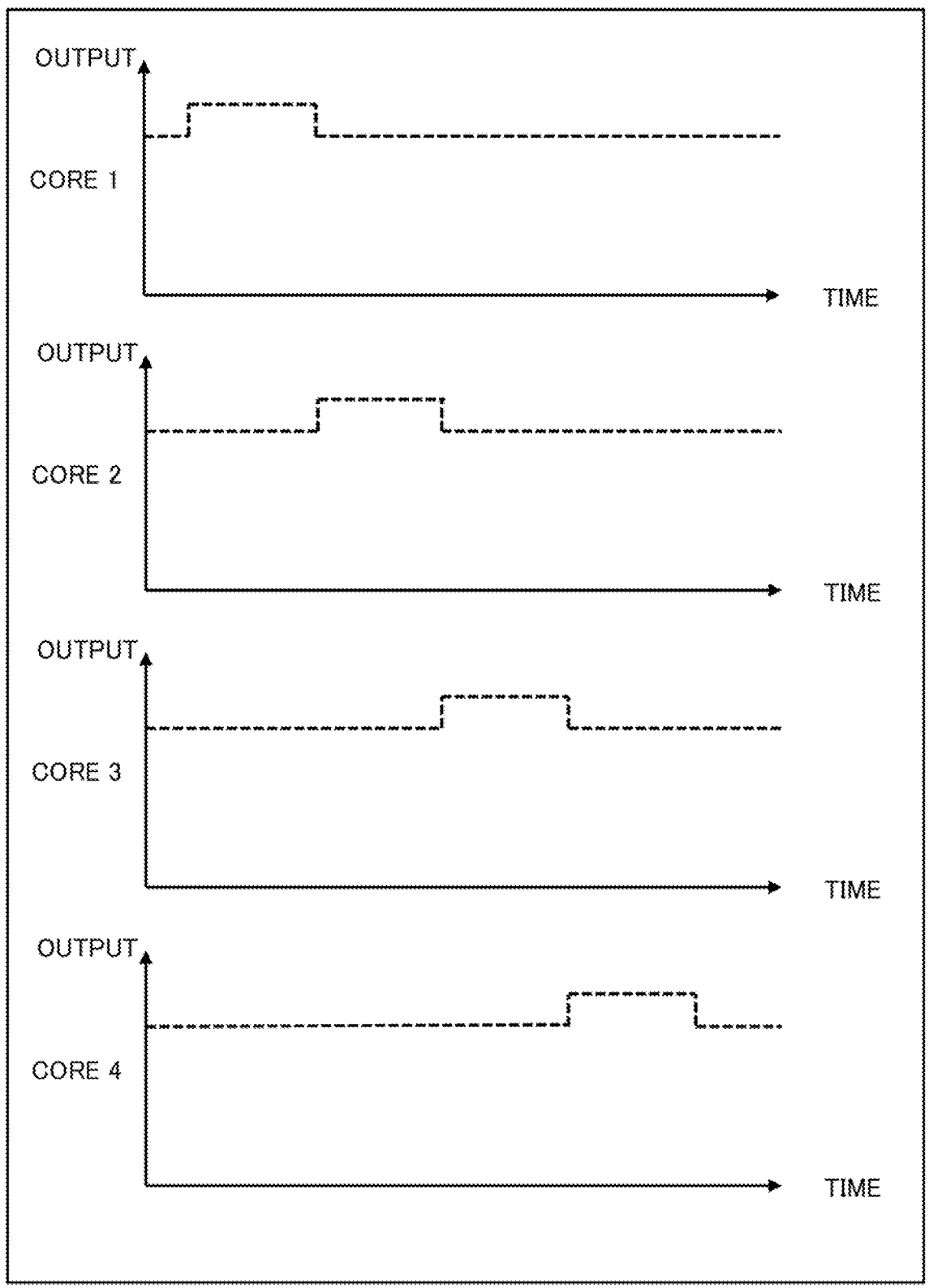
FIG. 13 is a waveform diagram for describing dither information applied to a used core 1 to a used core 4.

Next, a monitoring device, a monitoring method, an optical amplifier, and an optical transmission system according to a fifth example embodiment of the present invention will be described. The present example embodiment relates to a configuration acquired by further embodying the configuration according to the fourth example embodiment and also combined with the configuration according to the second example embodiment and the third example embodiment. An element similar to that in the second example embodiment, the third example embodiment, and the fourth example embodiment described above is provided with same reference sign, and the detailed description thereof will be omitted. FIG. 12 is a block diagram for describing the monitoring device, the optical amplifier, and the optical transmission system according to the fifth example embodiment of the present invention. FIG. 13 is a waveform diagram for describing dither information applied to a used core 1 to a used core 4.

The monitoring device included in FIG. 12 includes a controller 29 instead of the controller 18 of the monitoring device included in FIG. 7. Furthermore, the monitoring device included in FIG. 12 includes an optical coupler 26, an electric filter 27, and a power monitor 28 in addition to the monitoring device included in FIG. 7. The optical coupler 26 splits signal light from each single-mode fiber of a FIFO device 15. The electric filter 27 extracts dither information that is superimposed on signal light propagating through a plurality of used cores and has frequencies different from each other. The power monitor 28 monitors signal intensity of the dither information that is extracted by the electric filter 27, is superimposed on the signal light propagating through the plurality of used cores, and has frequencies different from each other.

The electric filter 27 is provided in such a way as to be able to extract dither information that is superimposed on signal light propagating through a plurality of used cores and has frequencies different from each other as in FIG. 11 referred in the description of the fourth example embodiment. When dither provided to the used core 1 is a sinusoidal wave of 1 kHz, dither provided to the used core 2 is a sinusoidal wave of 2 kHz, dither provided to the used core 3 is a sinusoidal wave of 3 kHz, and dither provided to the used core 4 is a sinusoidal wave of 4 kHz as described above in the fourth example embodiment, a peak related to the used core 1, a peak related to the used core 2, a peak related to the used core 3, and a peak related to the used core 4 appear at frequencies of 1 kHz, 2 kHz, 3 kHz, and 4 kHz. In absence of crosstalk between cores, magnitude of the peaks is the same, and thus an influence of the crosstalk can be recognized from a difference when the magnitude is not the same.

Furthermore, the present example embodiment also uses dither application and monitoring of the application result in the second example embodiment described above. As in FIG. 6 referred in the description described above, a value different from other used cores is applied to only one used core among the used cores in such a way that 1.05 is applied to the used core 1 and 1 is applied to the used cores 2 to 4 at the time 1, and the power $P_{mon1}$ of the unused core at this time (time 1) is monitored. A value different from other used cores is applied to only one used core among the used cores in such a way that 1.05 is applied to the used core 2 and 1 is applied to the used cores 1, 3, and 4 at the time 2, and the power $P_{mon2}$ of the unused core at this time (time 2) is monitored. A value different from other used cores is applied to only one used core among the used cores in such a way that 1.05 is applied to the used core 3 and 1 is applied to the used cores 1, 2, and 4 at the time 3, and the power $P_{mon3}$ of the unused core at this time (time 3) is monitored. A value different from other used cores is applied to only one used core among the used cores in such a way that 1.05 is applied to the used core 4 and 1 is applied to the used cores 1 to 3 at the time 4, and the power $P_{mon4}$ of the unused core at this time (time 4) is monitored. FIG. 13 illustrates one example of intensity of signal light to which dither information having a time and a changing applied value is applied, for each of a plurality of used cores to be monitored, specifically, for each of the used core 1, the used core 2, the used core 3, and the used core 4. Although the detailed illustration is omitted from FIG. 13, dither information being illustrated in FIG. 11 and having frequencies different from each other is also superimposed on each waveform of the used core 1, the used core 2, the used core 3, and the used core 4.

In order to achieve superimposition of such dither information, it is assumed that a frequency of dither applied to an optical signal propagating through a plurality of used cores to be monitored as illustrated in FIG. 13 is sufficiently lower than a frequency of dither having a different frequency and being provided as identification information that identifies the plurality of used cores. In other words, as a frequency of dither having a different frequency and being provided as identification information that identifies a plurality of used cores, a frequency sufficiently higher than a frequency of dither applied to an optical signal propagating through the plurality of used cores to be monitored as illustrated in FIG. 13 is selected.

Further, as dither having a different frequency and being provided as identification information that identifies a plurality of used cores, dither at a frequency lower than a response frequency of an amplification medium of an optical amplifier is selected in consideration of a combination with the optical amplifier. By selecting such a frequency, identification information remains in an optical signal passing through an amplification medium of an optical amplifier, and a plurality of used cores can be identified.

Advantageous Effect of Example Embodiment

According to the present example embodiment, similarly to the first example embodiment described above and the like, a monitoring device and a monitoring method that can handle an increase in core number of a multi-core optical fiber transmission path and are suitable for crosstalk monitoring can be achieved.

Further, in the present example embodiment, similarly to the fourth example embodiment, when a time fluctuation is caused by a change in an environment in which a multi-core optical fiber transmission path to be monitored operates, such as a temperature change and a stress change, for example, crosstalk can also be monitored.

Furthermore, in the optical amplifier and the optical transmission system to which the monitoring device and the monitoring method according to the present example embodiment are applied, similarly to the second example embodiment described above and the like, even when a monitoring part is not disposed for each used core of a multi-core optical fiber as in the background art, information related to power of a plurality of used cores can be acquired, and thus space saving can be achieved.

Other Example Embodiment

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

For example, in the second example embodiment described above and the like, with reference to FIG. 2, description is given on an assumption that a core number of the multi-core optical fiber transmission path $11_1$ is four, a core number of the multi-core optical fiber transmission path $11_2$ is five including a monitoring-specific core, and a core number of the multi-core optical fiber transmission path $11_3$ is four, but a core number of a multi-core optical fiber transmission path to which the present invention can be applied is not limited thereto. Further, the present invention is not limited to a form in which the four used cores 51 are disposed in a square arrangement in the one clad 50 as in FIG. 3. For example, as in FIG. 14A, the present invention can also be applied to a multi-core optical fiber transmission path in which seven cores are included in one clad 60 and six cores 61 are disposed in a hexagonal close-packed arrangement. In FIG. 14A, the core located at the center of the six cores 61 is assumed to be a monitoring-specific core 62a.

Further, as in FIG. 14B, the present invention can also be applied to a multi-core optical fiber transmission path in which seven cores are included in one clad 60 and six cores are disposed in a hexagonal close-packed arrangement. In FIG. 14B, one core of the six cores is assumed to be a monitoring-specific core 62b. In a case of an arrangement of a used core and a monitoring-specific core as in FIG. 14B, magnitude of a different pitch between the used core and the monitoring-specific core may be further reflected and calculated in a method of separation into a power component from a plurality of used cores by using dither information as in the second example embodiment described above.

The monitoring device and the monitoring method according to the present invention can also be applied to a multi-core optical fiber transmission path including many used cores, for example, 10 or more in one clad. When the monitoring technique according to the present invention is applied to such a multi-core optical fiber transmission path including many used cores in one clad, an arrangement in which six used cores are disposed in a hexagonal close-packed arrangement and a core located at the center of the six used cores is a monitoring-specific core as in the drawing at the center of FIG. 14A, for example, is recognized as one unit. Design may be performed with, as a monitoring-specific core 62c, a core located at the center of other six used cores 61 as in FIG. 14C in such a way that the one unit is repeated in a honeycomb pattern in one clad. Further, one unit repeated in a honeycomb pattern in one clad is not limited to a structure by a hexagonal close-packed arrangement, and may be recognized as a structure by a square arrangement as in FIG. 3.

A part or the whole of the above-described example embodiments may also be described as in supplementary notes below, which is not limited thereto.

Supplementary Note 1

A monitoring device of a multi-core optical fiber transmission path including a plurality of used cores and at least one or more non-used cores, the monitoring device including:
  an application means for applying dither to signal light propagating through the used core;
  a monitoring means for monitoring power of the non-used core; and
  a separation means for separating a monitoring result of the monitoring means into a power component from the plurality of used cores.

Supplementary Note 2

The monitoring device according to supplementary note 1, wherein,
  when a number of a plurality of used cores is N (note that N is an integer of two or more),
  the application means superimposes, on signal light propagating through a first used core among the plurality of used cores, dither having intensity different from intensity of signal light propagating through another used core among the plurality of used cores at a first point in time among N points in time (note that N is an integer of two or more) different from one another, and superimposes, on signal light propagating through a second used core among the plurality of used cores, dither having intensity different from intensity of signal light propagating through another used core among the plurality of used cores at a second point in time (note that N is an integer of two or more) different from the first point in time,
  the monitoring means monitors intensity of an optical signal acquired by superimposing the dither on signal light propagating through the first used core at the first point in time, and monitors intensity of an optical signal acquired by superimposing the dither on signal light propagating through the second used core at the second point in time, and
  the separation means performs separation into a power component from the plurality of used cores by using the monitoring results.

Supplementary Note 3

The monitoring device according to supplementary note 1, wherein
  the application means superimposes identification information on signal light propagating through the plurality of used cores, and
  the separation means performs separation into a power component from the plurality of used cores by referring to identification information superimposed on the signal light.

Supplementary Note 4

The monitoring device according to supplementary note 3, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

Supplementary Note 5

The monitoring device according to supplementary note 4, wherein the separation means performs separation into a power component from the plurality of used cores by referring to a difference in frequency between the first frequency and the second frequency.

Supplementary Note 6

An optical amplifier including:
  an optical amplification means that is inserted into a multi-core optical fiber transmission path including a plurality of used cores and at least one or more non-used cores, and amplifies an optical signal propagating through the plurality of used cores; and
  the monitoring device according to supplementary note 1 or 2.

Supplementary Note 7

The optical amplifier according to supplementary note 6, wherein the application means of the monitoring device includes a pumping light source for the optical amplification means, and an optical coupler that couples pumping light from the pumping light source to signal light propagating through the plurality of used cores.

Supplementary Note 8

The optical amplifier according to supplementary note 7, wherein the pumping light source includes a plurality of pumping light sources, and intensity of the plurality of pumping light sources is individually controlled in association with the dither.

Supplementary Note 9

The optical amplifier according to supplementary note 7 or 8, further including a lookup table that holds, in pair, a drive current of the pumping light source and a signal output of an optical signal amplified by the optical amplification means.

Supplementary Note 10

An optical amplifier including:
an optical amplification means that is inserted into a multi-core optical fiber transmission path including a plurality of used cores and at least one or more non-used cores, and amplifies an optical signal propagating through the plurality of used cores; and
the monitoring device according to any one of supplementary notes 3 to 5.

Supplementary Note 11

The optical amplifier according to supplementary note 10, wherein the application means of the monitoring device includes a pumping light source for the optical amplification means, and an optical coupler that couples pumping light from the pumping light source to signal light propagating through the plurality of used cores.

Supplementary Note 12

The optical amplifier according to supplementary note 11, wherein the pumping light source includes a plurality of pumping light sources, and intensity of the plurality of pumping light sources is individually controlled in association with the dither.

Supplementary Note 13

The optical amplifier according to supplementary note 11 or 12, further including a lookup table that holds, in pair, a drive current of the pumping light source and a signal output of an optical signal amplified by the optical amplification means.

Supplementary Note 14

The optical amplifier according to any one of supplementary notes 10 to 13, further including a signal crosstalk source determination means for determining crosstalk of one used core among the plurality of used cores from a monitoring result of the monitoring means by using the identification information superimposed on signal light propagating through the used core.

Supplementary Note 15

The optical amplifier according to supplementary note 14, wherein
dither at the first frequency being superimposed on signal light propagating through the first used core and dither at the second frequency having a frequency different from the first frequency and being superimposed on signal light propagating through the second used core have substantially a same amplitude, and
a signal crosstalk source determination means includes
an electric filter that extracts dither at the first frequency being superimposed on signal light propagating through the used core and dither at the second frequency being superimposed on signal light propagating through the used core, and
a crosstalk monitor that acquires a crosstalk amount from dither at the first frequency and dither at the second frequency that are extracted by the electric filter.

Supplementary Note 16

The optical amplifier according to supplementary note 15, wherein
a frequency of dither applied to signal light propagating through the used core is higher than a frequency of dither at a first frequency and a frequency of dither at a second frequency being superimposed on signal light propagating through the used core, and
the frequency of dither at a first frequency and the frequency of at a second frequency superimposed on signal light propagating through the used core are lower than a response frequency of the optical amplification means.

Supplementary Note 17

The optical amplifier according to any one of supplementary notes 6 to 16, wherein a plurality of used cores are disposed in a square arrangement or a hexagonal close-packed arrangement, and the non-used core whose power is monitored is disposed at a center of the plurality of used cores.

Supplementary Note 18

An optical transmission system including:
a multi-core optical fiber transmission path including a plurality of used cores and at least one or more non-used cores; and
the optical amplifier according to any one of supplementary notes 7 to 9 and 11 to 17.

Supplementary Note 19

A monitoring method of a multi-core optical fiber transmission path including a plurality of used cores and at least one or more non-used cores, the monitoring method including:
applying dither to signal light propagating through the used core;
monitoring power of the non-used core; and
separating the monitoring result into a power component from the plurality of used cores.

Supplementary Note 20

The monitoring method according to supplementary note 19, further including:
when a number of a plurality of used cores is N (note that N is an integer of two or more),
superimposing, on signal light propagating through a first used core among the plurality of used cores, dither having intensity different from intensity of signal light propagating through another used core among the plurality of used cores at a first point in time among N points in time (note that N is an integer of two or more) different from one another, and superimposing, on signal light propagating through a second used core among the plurality of used cores, dither having intensity different from intensity of signal light propagating through another used core among the plurality of used cores at a second point in time (note that N is an integer of two or more) different from the first point in time;
monitoring intensity of an optical signal acquired by superimposing the dither on signal light propagating through the first used core at the first point in time, and monitoring intensity of an optical signal acquired by superimposing the dither on signal light propagating through the second used core at the second point in time; and performing separation into a power component from the plurality of used cores by using the monitoring results.

Supplementary Note 21

The monitoring method according to supplementary note 19, further including:
superimposing identification information on signal light propagating through the plurality of used cores, in application of the dither; and
performing separation into a power component from the plurality of used cores by referring to identification information superimposed on the signal light, in separation of the monitoring result.

Supplementary Note 22

The monitoring method according to supplementary note 21, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

Supplementary Note 23

The monitoring method according to supplementary note 22, further including performing separation into a power component from the plurality of used cores by referring to a difference in frequency between the first frequency and the second frequency.

This application is based upon and claims the benefit of priority from Japanese patent application No. 2020-31279, filed on Feb. 27, 2020, the disclosure of which is incorporated herein in its entirety by reference.

REFERENCE SIGNS LIST $11_1$, $11_2$, $11_3$ Multi-core optical fiber transmission path
12 Single-mode fiber
13 Dither application function
14, 15 FIFO device
16 Power monitor
17 Separation block
18 Controller
19 Driver
20 LD
21 Optical coupler
22 LUT
25 Signal crosstalk source core-determination unit
101 Multi-core optical fiber transmission path
102 Application means
103 Monitoring means
104 Separation means

What is claimed is:

1. A monitoring device of a multi-core optical fiber transmission path including a plurality of used cores and at least one or more non-used cores, the monitoring device comprising:
an application unit that applies dither to signal light propagating through the used core;
a monitoring unit that monitors power of the non-used core; and
a separation unit that separates a monitoring result of the monitoring unit into a power component from the plurality of used cores.

2. The monitoring device according to claim 1, wherein, when a number of a plurality of used cores is N (note that N is an integer of two or more),
the application unit superimposes, on signal light propagating through a first used core among the plurality of used cores, dither having intensity different from intensity of signal light propagating through another used core among the plurality of used cores at a first point in time among N points in time (note that N is an integer of two or more) different from one another, and superimposes, on signal light propagating through a second used core among the plurality of used cores, dither having intensity different from intensity of signal light propagating through another used core among the plurality of used cores at a second point in time different from the first point in time,
the monitoring unit monitors intensity of an optical signal acquired by superimposing the dither on signal light propagating through the first used core at the first point in time, and monitors intensity of an optical signal acquired by superimposing the dither on signal light propagating through the second used core at the second point in time, and
the separation unit performs separation into a power component from the plurality of used cores by using the monitoring results.

3. The monitoring device according to claim 1, wherein
the application unit superimposes identification information on signal light propagating through the plurality of used cores, and
the separation unit performs separation into a power component from the plurality of used cores by referring to identification information superimposed on the signal light.

4. The monitoring device according to claim 3, wherein the identification information includes dither at a first frequency being superimposed on signal light propagating through a first used core among the plurality of used cores, and dither at a second frequency having a frequency different from the first frequency and being superimposed on signal light propagating through a second used core among the plurality of used cores.

5. The monitoring device according to claim 4, wherein the separation unit performs separation into a power component from the plurality of used cores by referring to a difference in frequency between the first frequency and the second frequency.

6. An optical amplifier comprising:
optical amplification unit that is inserted into a multi-core optical fiber transmission path including a plurality of used cores and at least one or more non-used cores, and amplifies an optical signal propagating through the plurality of used cores; and
the monitoring device according to claim 1.

7. The optical amplifier according to claim 6, wherein the application unit of the monitoring device includes a pumping light source for the optical amplification unit, and an optical coupler that couples pumping light from the pumping light source to signal light propagating through the plurality of used cores.

8. The optical amplifier according to claim 7, wherein the pumping light source includes a plurality of pumping light sources, and intensity of the plurality of pumping light sources is individually controlled in association with the dither.

9. The optical amplifier according to claim 7, further comprising a lookup table that holds, in pair, a drive current of the pumping light source and a signal output of an optical signal amplified by the optical amplification unit.

10. An optical amplifier comprising:
an optical amplification unit that is inserted into a multi-core optical fiber transmission path including a plurality of used cores and at least one or more non-used cores, and amplifies an optical signal propagating through the plurality of used cores; and
the monitoring device according to claim 3.

11. The optical amplifier according to claim 10, wherein the application unit of the monitoring device includes a pumping light source for the optical amplification unit, and an optical coupler that couples pumping light from the pumping light source to signal light propagating through the plurality of used cores.

12. The optical amplifier according to claim 11, wherein the pumping light source includes a plurality of pumping light sources, and intensity of the plurality of pumping light sources is individually controlled in association with the dither.

13. The optical amplifier according to claim 11, further comprising a lookup table that holds, in pair, a drive current of the pumping light source and a signal output of an optical signal amplified by the optical amplification unit.

14. The optical amplifier according to claim 10, further comprising a signal crosstalk source core-determination unit that determines crosstalk of one used core among the plurality of used cores from a monitoring result of the monitoring unit by using the identification information superimposed on signal light propagating through the used core.

15. The optical amplifier according to claim 14, wherein
dither at the first frequency being superimposed on signal light propagating through the first used core and dither at the second frequency having a frequency different from the first frequency and being superimposed on signal light propagating through the second used core have substantially a same amplitude, and
the signal crosstalk source core-determination unit includes
an electric filter that extracts dither at the first frequency being superimposed on signal light propagating through the used core and dither at the second frequency being superimposed on signal light propagating through the used core, and
a crosstalk monitor that acquires a crosstalk amount from dither at the first frequency and dither at the second frequency that are extracted by the electric filter.

16. The optical amplifier according to claim 15, wherein a frequency of dither applied to signal light propagating through the used core is higher than a frequency of dither at a first frequency and a frequency of dither at a second frequency being superimposed on signal light propagating through the used core, and
the frequency of dither at a first frequency and the frequency of dither at a second frequency superimposed on signal light propagating through the used core are lower than a response frequency of the optical amplification unit.

17. An optical transmission system comprising:
a multi-core optical fiber transmission path including a plurality of used cores and at least one or more non-used cores; and
the optical amplifier according to claim 7.

18. A monitoring method of a multi-core optical fiber transmission path including a plurality of used cores and at least one or more non-used cores, the monitoring method comprising:
applying dither to signal light propagating through the used core;
monitoring power of the non-used core; and
separating the monitoring result into a power component from the plurality of used cores.

19. The monitoring method according to claim 18, further comprising:
when a number of a plurality of used cores is N (note that N is an integer of two or more),
superimposing, on signal light propagating through a first used core among the plurality of used cores, dither having intensity different from intensity of signal light propagating through another used core among the plurality of used cores at a first point in time among N points in time (note that N is an integer of two or more) different from one another, and superimposing, on signal light propagating through a second used core among the plurality of used cores, dither having intensity different from intensity of signal light propagating through another used core among the plurality of used cores at a second point in time different from the first point in time;
monitoring intensity of an optical signal acquired by superimposing the dither on signal light propagating through the first used core at the first point in time, and monitoring intensity of an optical signal acquired by superimposing the dither on signal light propagating through the second used core at the second point in time; and
performing separation into a power component from the plurality of used cores by using the monitoring results.

20. The monitoring method according to claim 18, further comprising:
superimposing identification information on signal light propagating through the plurality of used cores, in application of the dither; and
performing separation into a power component from the plurality of used cores by referring to identification information superimposed on the signal light, in separation of the monitoring result.

* * * * *